US008831523B2

(12) United States Patent
Damnjanovic et al.

(10) Patent No.: US 8,831,523 B2
(45) Date of Patent: Sep. 9, 2014

(54) METHODS AND APPARATUS FOR BEAMFORMING FOR FEMTOCELLS

(75) Inventors: Aleksandar Damnjanovic, Del Mar, CA (US); Alexei Yurievitch Gorokhov, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 150 days.

(21) Appl. No.: 12/818,054

(22) Filed: Jun. 17, 2010

(65) Prior Publication Data
US 2010/0323711 A1   Dec. 23, 2010

Related U.S. Application Data

(60) Provisional application No. 61/218,243, filed on Jun. 18, 2009.

(51) Int. Cl.
| H04B 1/00 | (2006.01) |
| H04J 11/00 | (2006.01) |
| H04W 72/08 | (2009.01) |
| H04B 7/06 | (2006.01) |
| H04W 84/04 | (2009.01) |
| H04W 52/18 | (2009.01) |
| H04W 72/04 | (2009.01) |
| H04W 24/02 | (2009.01) |

(52) U.S. Cl.
CPC .......... *H04J 11/0053* (2013.01); *H04W 84/045* (2013.01); *H04W 52/18* (2013.01); *H04W 72/082* (2013.01); *H04W 72/046* (2013.01); *H04W 24/02* (2013.01); *H04B 7/0626* (2013.01); *H04B 7/0617* (2013.01)
USPC .......... 455/63.2; 455/418; 455/420; 455/450; 455/338; 455/422.1; 455/464; 370/341; 370/431

(58) Field of Classification Search
CPC . H04B 7/0617; H04B 7/0626; H04J 11/0053; H04W 24/02; H04W 52/18; H04W 52/244; H04W 72/046; H04W 72/082; H04W 84/045
USPC .............. 455/418–420, 436–444, 432.1–433, 455/63.1, 63.4, 63.2, 82, 83, 562.1, 575.7, 455/418–420, 432.1–434, 435.1–435.3, 455/422.1, 450–455, 464, 509, 410, 411; 370/338, 339, 328–337, 341–348, 370/431–463
See application file for complete search history.

(56) References Cited

U.S. PATENT DOCUMENTS

| 6,600,933 B1 * | 7/2003 | Hiramatsu et al. ............ 455/561 |
| 6,606,058 B1 * | 8/2003 | Bonek et al. .................. 342/383 |

(Continued)

FOREIGN PATENT DOCUMENTS

| WO | WO2006010958 A2 | 2/2006 |
| WO | WO2008085952 A1 | 7/2008 |
| WO | WO2009070606 | 6/2009 |

OTHER PUBLICATIONS

International Search Report and Written Opinion—PCT/US2010/039277—International Search Authority, European Patent Office, Dec. 16, 2010.

(Continued)

*Primary Examiner* — Ronald Eisner
(74) *Attorney, Agent, or Firm* — Dalei Dong

(57) ABSTRACT

Methods and apparatus for beamforming for femtocells, such as in LTE wireless networks, to provide inter-cell coordination and interference mitigation are disclosed. A macrocell user equipment (UE) may determine information regarding an interfering femtocell node, such as a home eNodeB (HeNB). The information may be sent directly or indirectly, such as by a backhaul communication link, to the HeNB. The HeNB may adjust an output based on the information. The information may include spatial channel information, which may be used for beamforming at the HeNB output so as to mitigate interference in the direction of the UE.

39 Claims, 13 Drawing Sheets

(56) References Cited

U.S. PATENT DOCUMENTS

| | | | |
|---|---|---|---|
| 6,650,910 B1* | 11/2003 | Mazur et al. | 455/562.1 |
| 7,548,730 B2* | 6/2009 | Waxman | 455/69 |
| 7,664,492 B1* | 2/2010 | Lee et al. | 455/424 |
| 2004/0092256 A1* | 5/2004 | Keller et al. | 455/422.1 |
| 2005/0008092 A1* | 1/2005 | Kadous | 375/267 |
| 2007/0042799 A1 | 2/2007 | Jubin et al. | |
| 2008/0026763 A1 | 1/2008 | Van Rensburg et al. | |
| 2008/0040777 A1* | 2/2008 | Aihara et al. | 726/4 |
| 2008/0075059 A1* | 3/2008 | Kermoal et al. | 370/343 |
| 2008/0076420 A1* | 3/2008 | Khetawat et al. | 455/435.1 |
| 2009/0005031 A1 | 1/2009 | Van Lieshout et al. | |
| 2009/0042593 A1 | 2/2009 | Yavuz et al. | |
| 2009/0047971 A1* | 2/2009 | Fu | 455/450 |
| 2009/0092078 A1* | 4/2009 | Czaja et al. | 370/328 |
| 2010/0227611 A1* | 9/2010 | Schmidt et al. | 455/434 |
| 2010/0317386 A1* | 12/2010 | Da Silva et al. | 455/507 |
| 2010/0323663 A1* | 12/2010 | Vikberg et al. | 455/410 |
| 2011/0039566 A1* | 2/2011 | Zee et al. | 455/450 |
| 2011/0205930 A1* | 8/2011 | Rahman et al. | 370/252 |

OTHER PUBLICATIONS

Partial International Search Report—PCT/US2010/039277—International Search Authority, European Patent Office, Nov. 4, 2010.

Qualcomm Europe: "Signaling for spatial coordination in DL CoMP", 3GPP Draft; R1-092057 Signaling for Spatial Coordination in DL Comp, 3rd Generation Partnership Project (3GPP), Mobile Competence Centre ; 650, Route Des Lucioles ; F-06921 Sophia-Antipolis Cedex ; France, no. San Francisco, USA; Apr. 28, 2009, XP050339516, [retrieved on Apr. 28, 2009] paragraph [0003].

Yong Bai, et al., "Resource coordination and interference mitigation between macrocell and femtocell", Personal, Indoor and Mobile Radio Communications, 2009 IEEE 20th International Symposium on, IEEE, Piscataway, NJ, USA, Sep. 13, 2009, pp. 1401-1405, XP031659647, ISBN: 978-1-4244-5122-7.

Taiwan Search Report—TW099119954—TIPO—Feb. 25, 2013.

* cited by examiner

US 8,831,523 B2

METHODS AND APPARATUS FOR BEAMFORMING FOR FEMTOCELLS

CROSS-REFERENCE TO RELATED APPLICATIONS

This application claims priority under 35 U.S.C. §119(e) to U.S. Provisional Patent Application Ser. No. 61/218,243, entitled SYSTEMS AND METHODS OF BEAMFORMING FOR FEMTO CELLS IN LTE, filed on Jun. 18, 2009, the content of which is hereby incorporated by reference herein in its entirety for all purposes.

FIELD

This application is directed generally to wireless communications systems. More particularly, but not exclusively, the application relates to methods and apparatus for inter-cell interference coordination and mitigation.

BACKGROUND

Wireless communication systems are widely deployed to provide various types of communication content such as voice, data, video and the like, and deployments are likely to increase with introduction of new data oriented systems such as Long Term Evolution (LTE) systems. Wireless communications systems may be multiple-access systems capable of supporting communication with multiple users by sharing the available system resources (e.g., bandwidth and transmit power). Examples of such multiple-access systems include code division multiple access (CDMA) systems, time division multiple access (TDMA) systems, frequency division multiple access (FDMA) systems, 3GPP Long Term Evolution (LTE) systems and other orthogonal frequency division multiple access (OFDMA) systems.

Generally, a wireless multiple-access communication system can simultaneously support communication for multiple wireless terminals (also know as user equipments, ATs or UEs). Each terminal communicates with one or more base stations (also know as access points or APs) via transmissions on forward and reverse links. The forward link (also referred to as a downlink) refers to the communication link from the base stations to the terminals, and the reverse link (also referred to as an uplink) refers to the communication link from the terminals to the base stations. These communication links may be established via a single-in-single-out, single-in-multiple out, multiple-in-single-out or a multiple-in-multiple-out (MIMO) system. In MIMO systems, multiple antennas are used in both transmitters and receivers to improve communications performance without requiring additional transmit power or bandwidth. Next generation systems such as Long Term Evolution (LTE) allow for use of MIMO technology for enhanced performance and data throughput.

As the number of mobile stations deployed increases, the need for proper bandwidth utilization becomes more important. Moreover, with the introduction of semiautonomous base stations for managing small cells, such as femtocells, in systems such as LTE, interference with existing base stations may become an increasing problem.

SUMMARY

This disclosure relates generally to systems and methods for interference mitigation in communications systems such as LTE communication systems.

In one aspect, this disclosure is directed to a method for wireless communication, comprising detecting, at a user device associated with a first wireless network node, a signal transmitted by a second wireless network node, determining, from the signal, information regarding the second wireless network node, and transmitting the information to the second wireless network node.

In another aspect, this disclosure is directed to a user device, comprising a receiver module configured to receive signals from a first wireless network node and a second wireless network node, a signal information module configured to determine, from one of the signals received from the second wireless network node, information regarding the second wireless network node, and a transmitter module configured to send the information to the second wireless network node; wherein the information is useable to adjust an output of the second wireless network node.

In another aspect, this disclosure is directed to a method for wireless communication, comprising receiving, at a second wireless network node, information from a user device associated with a first wireless network node, wherein the information is determined from a signal provided from the second wireless network node and adjusting an output of the second wireless network node based on the information.

In another aspect, this disclosure is directed to a wireless communications network node, comprising a receiver module configured to receive a signal from a user device, said signal including node information regarding an output signal provided from the network node, a processor module configured to determine, based on the information, output signal adjustment information, and a transmitter module configured to adjust the output based on the output signal adjustment information.

In another aspect, this disclosure is directed to a method for wireless communication, comprising detecting, at a user device in communication with a first wireless network node, a signal transmitted by a second wireless network node, determining, from the signal, information regarding the second wireless network node, and transmitting the information to the first wireless network node.

In another aspect, this disclosure is directed to a user device, comprising a receiver module configured to receive signals from a first wireless network node and a second wireless network node, a signal information module configured to determine, from a signal received from the second wireless network node, information regarding the second wireless network node, and a transmitter module configured to send the information to the first wireless network node wherein the information is useable to adjust an output of the first wireless network node.

In another aspect, this disclosure is directed to a method for wireless communication, comprising receiving, at a first wireless network node, information derived by a user device from a signal provided from a second wireless network node and send the information from the first wireless network node to the second wireless network node.

In another aspect, this disclosure is directed to a wireless communications network node apparatus, comprising a receiver module configured to receive a signal from a user device in communication with a wireless network node, said signal including node information regarding a signal provided from the wireless network node and a backhaul communications module configured to transmit the information, via a backhaul connection, to the wireless network node.

In another aspect, this disclosure is directed to a method for wireless communication, comprising receiving, from a backhaul connection, information forwarded by a first wireless network node, wherein the information is determined from a signal provided from a second wireless network node and adjusting an output of the second wireless network node based on the information.

In another aspect, this disclosure is directed to a wireless network node apparatus, comprising a receiver module configured to receive a signal from a user device in communication with a first wireless network node, said signal including information regarding a signal provided from a second wireless network node, a processor module configured to determine, based on the information, output signal adjustment information, and a transmitter module configured to adjust an output provided from the second wireless network node based on the output signal adjustment information.

In another aspect, this disclosure is directed to a method for wireless communication, comprising, detecting, at a user device in communication with a first wireless network node, a second wireless network node, sending, from the user device to the first wireless network node, a request for a transmission gap, receiving at the user device, from the second wireless network node during the transmission gap, a signal, determining, from the signal, information regarding the second wireless network node, establishing a communication link with the second wireless network node, and sending, via the communication link, the information to the second wireless network node.

In another aspect, this disclosure is directed to a user device, comprising a receiver module configured to, receive signals from a first wireless network node and a second wireless network node; send, to the first wireless network node, a request for a transmission gap; and receive, during the transmission gap, a signal from the second wireless network node, a signal information module configured to determine, from the signal, information regarding the second wireless network node, and a transmitter module configured to send the information to the second wireless network node, wherein the information is usable to adjust an output of the second wireless network node.

In another aspect, this disclosure is directed to a method for wireless communication, comprising receiving, at a restricted node, from a user device not subscribed to the restricted node, a request to communicate, establishing a communication link with the user device, receiving, from the communication link, information regarding an output signal of the restricted node, and adjusting the output of the restricted node based on the information.

In another aspect, this disclosure is directed to a wireless network node, comprising a receiver module configured to receive, from a user device not subscribed to the network node, a request to communicate; establish a communication link with the user device; and receive, from the communication link, information regarding the wireless network node, a processor module configured to determine, based on the information, output signal adjustment information, and a transmitter module configured to adjust an output based on the output signal adjustment information.

Additional aspects are further described below in conjunction with the appended drawings.

BRIEF DESCRIPTION OF THE DRAWINGS

The present application may be more fully appreciated in connection with the following detailed description taken in conjunction with the accompanying drawings, wherein.

DETAILED DESCRIPTION OF EMBODIMENTS

Figure 1:
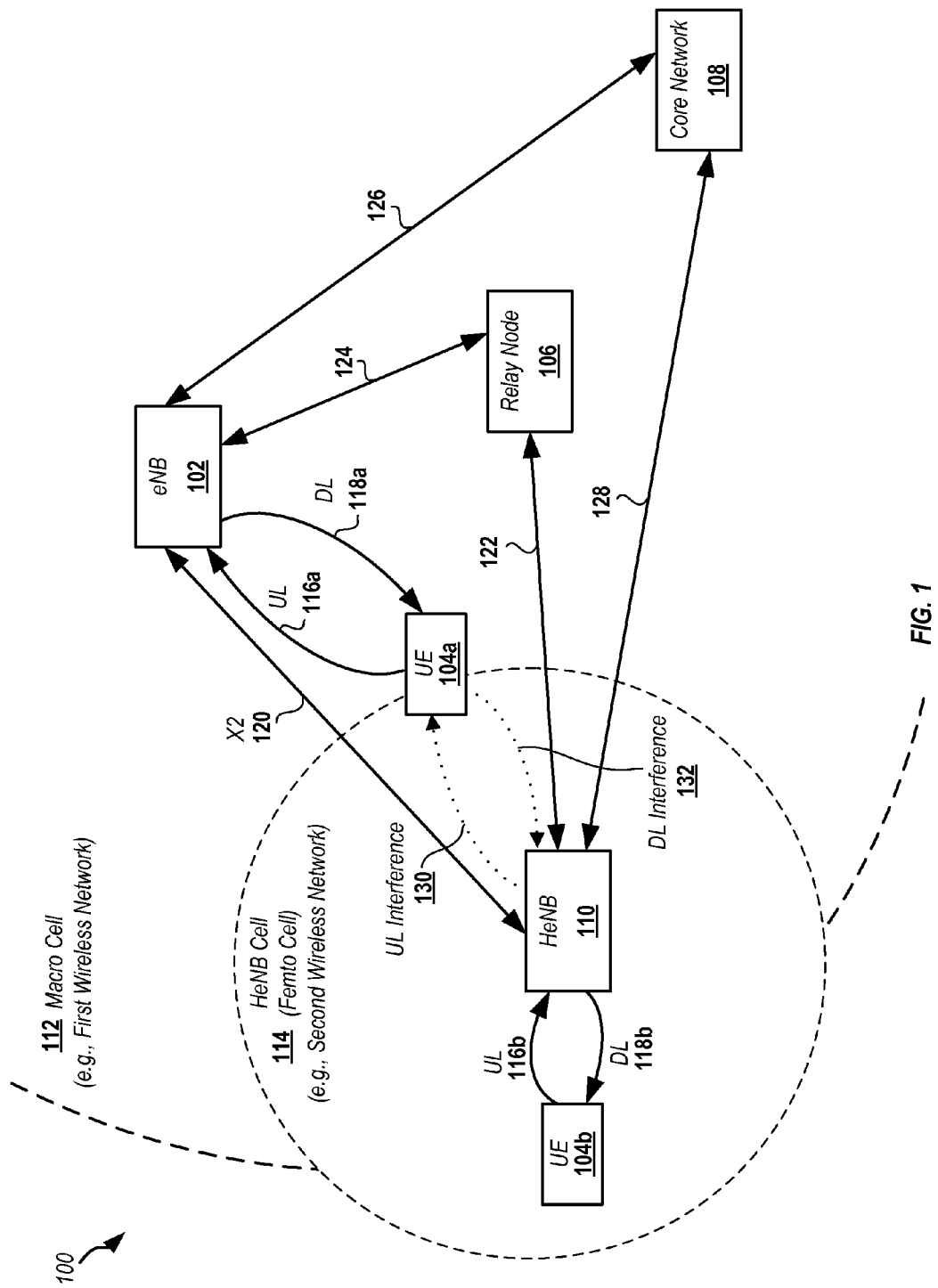
FIG. 1 illustrates details of a wireless communications system including a macrocell and a femtocell.

This disclosure relates generally to interference coordination and management in wireless communications systems. In various embodiments, the techniques and apparatus described herein may be used for wireless communication networks such as Code Division Multiple Access (CDMA) networks, Time Division Multiple Access (TDMA) networks, Frequency Division Multiple Access (FDMA) networks, Orthogonal FDMA (OFDMA) networks, Single-Carrier FDMA (SC-FDMA) networks, LTE networks, as well as other communications networks. As described herein, the terms "networks" and "systems" may be used interchangeably.

In one aspect, this disclosure is directed to a method for wireless communication, comprising detecting, at a user device associated with a first wireless network node, a signal transmitted by a second wireless network node, determining, from the signal, information regarding the second wireless network node, and transmitting the information to the second wireless network node.

In another aspect, this disclosure is directed to a computer program product comprising a computer-readable medium including codes for causing a computer to detect, at a user device associated with a first wireless network node, a signal transmitted by a second wireless network node, determine, from the signal, information regarding the second wireless network node and transmit the information to the second wireless network node.

In another aspect, this disclosure is directed to a user device, comprising a receiver module configured to receive signals from a first wireless network node and a second wireless network node, a signal information module configured to determine, from one of the signals received from the second wireless network node, information regarding the second wireless network node, and a transmitter module configured to send the information to the second wireless network node;

wherein the information is useable to adjust an output of the second wireless network node.

In another aspect, this disclosure is directed to a user device, comprising means for receiving signals from a first wireless network node and a second wireless network node, means for determining, from a signal received from the second wireless network node, information regarding the second wireless network node. And means for sending the information to the second wireless network node, wherein the information is useable to adjust an output of the second wireless network node.

In another aspect, this disclosure is directed to a method for wireless communication, comprising receiving, at a second wireless network node, information from a user device associated with a first wireless network node, wherein the information is determined from a signal provided from the second wireless network node and adjusting an output of the second wireless network node based on the information.

In another aspect, this disclosure is directed to a computer program product comprising a computer-readable medium including codes for causing a computer to receive, at a second wireless network node, information from a user device associated with a first wireless network node, wherein the information is determined from a signal provided from the second wireless network node and adjust an output of the second wireless network node based on the information.

In another aspect, this disclosure is directed to a wireless communications network node, comprising a receiver module configured to receive a signal from a user device, said signal including node information regarding an output signal provided from the network node, a processor module configured to determine, based on the information, output signal adjustment information, and a transmitter module configured to adjust the output based on the output signal adjustment information.

In another aspect, this disclosure is directed to a wireless communications network node, comprising means for receiving a signal from a user device, said signal including node information regarding an output signal provided from the network node, means for determining, based on the node information, output signal adjustment information, and means for adjusting the output signal based on the output signal adjustment information.

In another aspect, this disclosure is directed to a method for wireless communication, comprising detecting, at a user device in communication with a first wireless network node, a signal transmitted by a second wireless network node, determining, from the signal, information regarding the second wireless network node, and transmitting the information to the first wireless network node.

In another aspect, this disclosure is directed to a computer program product comprising a computer-readable medium including codes for causing a computer to detect, at a user device in communication with a first wireless network node, a signal transmitted by a second wireless network node, determine, from the signal, information regarding the second wireless network node, and transmit the information to the first wireless network node.

In another aspect, this disclosure is directed to a user device, comprising a receiver module configured to receive signals from a first wireless network node and a second wireless network node, a signal information module configured to determine, from a signal received from the second wireless network node, information regarding the second wireless network node, and a transmitter module configured to send the information to the first wireless network node wherein the information is useable to adjust an output of the first wireless network node.

In another aspect, this disclosure is directed to a user device, comprising means for receiving signals from a first wireless network node and a second wireless network node, means for determining, from a signal received from the second wireless network node, information regarding the second wireless network node, and means for sending the information to the first wireless network node wherein the information is useable to adjust an output of the first wireless network node.

In another aspect, this disclosure is directed to a method for wireless communication, comprising receiving, at a first wireless network node, information derived by a user device from a signal provided from a second wireless network node and send the information from the first wireless network node to the second wireless network node.

In another aspect, this disclosure is directed to a computer program product comprising a computer-readable medium including codes for causing a computer to receive, at a first wireless network node, information derived by a user device from a signal provided from a second wireless network node and send the information from the first wireless network node to the second wireless network node.

In another aspect, this disclosure is directed to a wireless communications network node apparatus, comprising a receiver module configured to receive a signal from a user device in communication with a wireless network node, said signal including node information regarding a signal provided from the wireless network node and a backhaul communications module configured to transmit the information, via a backhaul connection, to the wireless network node.

In another aspect, this disclosure is directed to a wireless network node apparatus, comprising means for receiving a signal from a user device in communication with a wireless network node, said signal including node information regarding a signal provided from the wireless network node and means for sending the information, via a backhaul connection, to the wireless network node.

In another aspect, this disclosure is directed to a method for wireless communication, comprising receiving, from a backhaul connection, information forwarded by a first wireless network node, wherein the information is determined from a signal provided from a second wireless network node and adjusting an output of the second wireless network node based on the information.

In another aspect, this disclosure is directed to a computer program product comprising a computer-readable medium including codes for causing a computer to receive, from a backhaul connection, information forwarded by a first wireless network node, wherein the information is determined from a signal provided from the second wireless network node and adjust an output of the second wireless network node based on the information.

In another aspect, this disclosure is directed to a wireless network node apparatus, comprising a receiver module configured to receive a signal from a user device in communication with a first wireless network node, said signal including information regarding a signal provided from a second wireless network node, a processor module configured to determine, based on the information, output signal adjustment information, and a transmitter module configured to adjust an output provided from the second wireless network node based on the output signal adjustment information.

In another aspect, this disclosure is directed to a wireless network node, comprising means for receiving a signal from a user device in communication with a first wireless network node, said signal including information regarding a signal provided from the network node, means for determining, based on the information, output signal adjustment information, and means for adjusting an output signal based on the output signal adjustment information.

In another aspect, this disclosure is directed to a method for wireless communication, comprising, detecting, at a user device in communication with a first wireless network node, a second wireless network node, sending, from the user device to the first wireless network node, a request for a transmission gap, receiving at the user device, from the second wireless network node during the transmission gap, a signal, determining, from the signal, information regarding the second wireless network node, establishing a communication link with the second wireless network node, and sending, via the communication link, the information to the second wireless network node.

In another aspect, this disclosure is directed to a computer program product comprising a computer-readable medium including codes for causing a computer to detect, at a user device in communication with a first wireless network node, a second wireless network node, send, from the user device to the first wireless network node, a request for a transmission gap, receive at the user device, from the second wireless network node during the transmission gap, a signal, determine, from the signal, information regarding the second wireless network node, establish a communication link with the second wireless network node, and send, via the communication link, the information to the second wireless network node.

In another aspect, this disclosure is directed to a user device, comprising a receiver module configured to, receive signals from a first wireless network node and a second wireless network node; send, to the first wireless network node, a request for a transmission gap; and receive, during the transmission gap, a signal from the second wireless network node, a signal information module configured to determine, from the signal, information regarding the second wireless network node, and a transmitter module configured to send the information to the second wireless network node, wherein the information is usable to adjust an output of the second wireless network node.

In another aspect, this disclosure is directed to a user device, comprising means for receiving signals from a first wireless network node and a second wireless network node, means for sending, to the first wireless network, a request for a transmission gap, means for receiving, during the transmission gap, a signal from the second wireless network node, means for determining, from the signal, information regarding the second wireless network node, and, means for sending the information to the second wireless network node, wherein the information is usable to adjust an output of the second wireless network node.

In another aspect, this disclosure is directed to a method for wireless communication, comprising receiving, at a restricted node, from a user device not subscribed to the restricted node, a request to communicate, establishing a communication link with the user device, receiving, from the communication link, information regarding an output signal of the restricted node, and adjusting the output of the restricted node based on the information.

In another aspect, this disclosure is directed to a computer program product comprising a computer-readable medium including codes for causing a computer to receive, at a restricted node, from a user device not subscribed to the restricted node, a request to communicate, establish a communication link with the user device, receive, from the communication link, information regarding the restricted node, and adjust an output of the restricted node based on the information.

In another aspect, this disclosure is directed to a wireless network node, comprising a receiver module configured to receive, from a user device not subscribed to the network node, a request to communicate; establish a communication link with the user device; and receive, from the communication link, information regarding the wireless network node, a processor module configured to determine, based on the information, output signal adjustment information, and a transmitter module configured to adjust an output based on the output signal adjustment information.

In another aspect, this disclosure is directed to a wireless network node, comprising means for receiving, from a user device not subscribed to the wireless network node, a request to communicate, means for establishing a communication link with the user device, means for receiving, from the communication link, information regarding the wireless network node, means for determining, based on the information, output signal adjustment information, and means for adjusting an output based on the output signal adjustment information. Additional details of various aspects are further described below in conjunction with the appended figures.

Various aspects of the disclosure are described below. It should be apparent that the teachings herein may be embodied in a wide variety of forms and that any specific structure, function, or both being disclosed herein is merely representative. Based on the teachings herein one skilled in the art should appreciate that an aspect disclosed herein may be implemented independently of any other aspects and that two or more of these aspects may be combined in various ways. For example, an apparatus may be implemented or a method may be practiced using any number of the aspects set forth herein. In addition, such an apparatus may be implemented or such a method may be practiced using other structure, functionality, or structure and functionality in addition to or other than one or more of the aspects set forth herein. Furthermore, an aspect may comprise at least one element of a claim.

A CDMA network may implement a radio technology such as Universal Terrestrial Radio Access (UTRA), cdma2000 and the like. UTRA includes Wideband-CDMA (W-CDMA) and Low Chip Rate (LCR). Cdma2000 covers IS-2000, IS-95 and IS-856 standards. A TDMA network may implement a radio technology such as Global System for Mobile Communications (GSM).

An OFDMA network may implement a radio technology such as Evolved UTRA (E-UTRA), IEEE 802.11, IEEE 802.16, IEEE 802.20, Flash-OFDM and the like. UTRA, E-UTRA, and GSM are part of Universal Mobile Telecommunication System (UMTS). In particular, Long Term Evolution (LTE) is an upcoming release of UMTS that uses E-UTRA. UTRA, E-UTRA, GSM, UMTS and LTE are described in documents provided from an organization named "3rd Generation Partnership Project" (3GPP), and cdma2000 is described in documents from an organization named "3rd Generation Partnership Project 2" (3GPP2). These various radio technologies and standards are known or are being developed in the art. For example, the 3rd Generation Partnership Project (3GPP) is a collaboration between groups of telecommunications associations that aims to define a globally applicable third generation (3G) mobile phone specification. 3GPP Long Term Evolution (LTE) is a 3GPP project aimed at improving the Universal Mobile Telecommunications System (UMTS) mobile phone standard. The 3GPP may define specifications for the next generation of mobile networks, mobile systems, and mobile devices. For clarity, certain aspects of the apparatus and techniques are described below for LTE implementations, and LTE terminology is used in much of the description below; however, the description is not intended to be limited to LTE applications. Accordingly, it will be apparent to one of skill in the art that the apparatus and methods described herein may be applied to various other communications systems and applications.

Logical channels in wireless communications systems may be classified into Control Channels and Traffic Channels. Logical Control Channels may comprise a Broadcast Control Channel (BCCH) which is a downlink (DL) channel for broadcasting system control information, a Paging Control Channel (PCCH) which is a DL channel that transfers paging information and a Multicast Control Channel (MCCH) which is a Point-to-multipoint DL channel used for transmitting Multimedia Broadcast and Multicast Service (MBMS) scheduling and control information for one or several MTCHs. Generally, after establishing a Radio Resource Control (RRC) connection this channel is only used by UEs that receive MBMS. A Dedicated Control Channel (DCCH) is a Point-to-point bi-directional channel that transmits dedicated control information and is used by UEs having an RRC connection.

Logical Traffic Channels may comprise a Dedicated Traffic Channel (DTCH) which is Point-to-point bi-directional channel, dedicated to one UE, for the transfer of user information, and a Multicast Traffic Channel (MTCH) for Point-to-multipoint DL channel for transmitting traffic data.

Transport Channels may be classified into Downlink (DL) and Uplink (UL). DL Transport Channels comprises a Broadcast Channel (BCH), Downlink Shared Data Channel (DL-SDCH) and a Paging Channel (PCH). The PCH may be used for support of UE power saving (when a DRX cycle is indicated by the network to the UE), broadcast over an entire cell and mapped to PHY resources which can be used for other control/traffic channels. The UL Transport Channels may comprise a Random Access Channel (RACH), a Request Channel (REQCH), an Uplink Shared Data Channel (UL-SDCH) and a plurality of PHY channels. The PHY channels may comprise a set of DL channels and UL channels.

In addition, the DL PHY channels may comprise the following:
Common Pilot Channel (CPICH)
Synchronization Channel (SCH)
Common Control Channel (CCCH)
Shared DL Control Channel (SDCCH)
Multicast Control Channel (MCCH)
Shared UL Assignment Channel (SUACH)
Acknowledgement Channel (ACKCH)
DL Physical Shared Data Channel (DL-PSDCH)
UL Power Control Channel (UPCCH)
Paging Indicator Channel (PICH)
Load Indicator Channel (LICH).
The UL PHY Channels may comprise the following:
Physical Random Access Channel (PRACH)
Channel Quality Indicator Channel (CQICH)
Acknowledgement Channel (ACKCH)
Antenna Subset Indicator Channel (ASICH)
Shared Request Channel (SREQCH)
UL Physical Shared Data Channel (UL-PSDCH)
Broadband Pilot Channel (BPICH)

The word "exemplary" is used herein to mean "serving as an example, instance, or illustration." Any embodiment described herein as "exemplary" is not necessarily to be construed as preferred or advantageous over other embodiments.

For purposes of explanation of various embodiments, the following terminology and abbreviations may be used herein:
AM Acknowledged Mode
AMD Acknowledged Mode Data
ARQ Automatic Repeat Request
BCCH Broadcast Control CHannel
BCH Broadcast CHannel
C- Control-
CCCH Common Control CHannel
CCH Control CHannel
CCTrCH Coded Composite Transport Channel
CP Cyclic Prefix
CRC Cyclic Redundancy Check
CTCH Common Traffic CHannel
DCCH Dedicated Control CHannel
DCH Dedicated CHannel
DL DownLink
DSCH Downlink Shared CHannel
DTCH Dedicated Traffic CHannel
FACH Forward link Access CHannel
FDD Frequency Division Duplex
L1 Layer 1 (physical layer)
L2 Layer 2 (data link layer)
L3 Layer 3 (network layer)
LI Length Indicator
LSB Least Significant Bit
MAC Medium Access Control
MBMS Multmedia Broadcast Multicast Service
MCCH MBMS point-to-multipoint Control CHannel
MRW Move Receiving Window
MSB Most Significant Bit
MSCH MBMS point-to-multipoint Scheduling CHannel
MTCH MBMS point-to-multipoint Traffic CHannel
PCCH Paging Control CHannel
PCH Paging CHannel
PDU Protocol Data Unit
PHY PHYsical layer
PhyCH Physical CHannels
RACH Random Access CHannel
RLC Radio Link Control
RRC Radio Resource Control
SAP Service Access Point
SDU Service Data Unit
SHCCH SHared channel Control CHannel
SN Sequence Number
SUFI SUper FIeld
TCH Traffic CHannel
TDD Time Division Duplex
TFI Transport Format Indicator
TM Transparent Mode
TMD Transparent Mode Data
TTI Transmission Time Interval
U- User-
UE User Equipment
UL UpLink
UM Unacknowledged Mode
UMD Unacknowledged Mode Data
UMTS Universal Mobile Telecommunications System
UTRA UMTS Terrestrial Radio Access
UTRAN UMTS Terrestrial Radio Access Network
MBSFN Multicast broadcast single frequency network
MCE MBMS coordinating entity
MCH Multicast channel
DL-SCH Downlink shared channel
MSCH MBMS control channel
PDCCH Physical downlink control channel
PDSCH Physical downlink shared channel A MIMO system employs multiple ($N_T$) transmit antennas and multiple ($N_R$) receive antennas for data transmission. A MIMO channel formed by the $N_T$ transmit and $N_R$ receive antennas may be decomposed into $N_S$ independent channels, which are also referred to as spatial channels. The maximum spatial multiplexing $N_S$ if a linear receiver is used is min($N_T$, $N_R$), with each of the $N_S$ independent channels corresponding to a dimension. This provides an $N_S$ increase in spectral efficiency. A MIMO system can provide improved performance (e.g., higher throughput and/or greater reliability) if the additional dimensionalities created by the multiple transmit and receive antennas are utilized. The special dimension may be described in terms of a rank.

MIMO systems support time division duplex (TDD) and frequency division duplex (FDD) implementations. In a TDD system, the forward and reverse link transmissions use the same frequency regions so that the reciprocity principle allows the estimation of the forward link channel from the reverse link channel. This enables the access point to extract transmit beamforming gain on the forward link when multiple antennas are available at the access point.

System designs may support various time-frequency reference signals for the downlink and uplink to facilitate beamforming and other functions. A reference signal is a signal generated based on known data and may also be referred to as a pilot, preamble, training signal, sounding signal and the like. A reference signal may be used by a receiver for various purposes such as channel estimation, coherent demodulation, channel quality measurement, signal strength measurement and the like. Reference signals may be used to facilitate beamforming at a transmitter. LTE systems support beamforming using precoding. Beamforming may be implemented in LTE systems by adjusting the gain and phase of the same signal sent from different transmit antennas so at to adjust the output signal power in a particular direction or directions, which may be used to maximize signal strength in a particular direction or conversely reduce or minimize signal strength in a particular direction.

3GPP Specification 36211-900 defines in Section 5.5 particular reference signals for demodulation, associated with transmission of PUSCH or PUCCH, as well as sounding, which is not associated with transmission of PUSCH or PUCCH. For example, Table 1 lists some reference signals for LTE implementations that may be transmitted on the downlink and uplink and provides a short description for each reference signal. A cell-specific reference signal may also be referred to as a common pilot, a broadband pilot and the like. A UE-specific reference signal may also be referred to as a dedicated reference signal.

TABLE 1

| Link | Reference Signal | Description |
| --- | --- | --- |
| Downlink | Cell Specific Reference Signal | Reference signal sent by a Node B and used by the UEs for channel estimation and channel quality measurement. |
| Downlink | UE Specific Reference Signal | Reference signal sent by a Node B to a specific UE and used for demodulation of a downlink transmission from the Node B. |
| Uplink | Sounding Reference Signal | Reference signal sent by a UE and used by a Node B for channel estimation and channel quality measurement. |
| Uplink | Demodulation Reference Signal | Reference signal sent by a UE and used by a Node B for demodulation of an uplink transmission from the UE. |

In some implementations a system may utilize time division duplexing (TDD). For TDD, the downlink and uplink share the same frequency spectrum or channel, and downlink and uplink transmissions are sent on the same frequency spectrum. The downlink channel response may thus be correlated with the uplink channel response. A reciprocity principle may allow a downlink channel to be estimated based on transmissions sent via the uplink. These uplink transmissions may be reference signals or uplink control channels (which may be used as reference symbols after demodulation). The uplink transmissions may allow for estimation of a space-selective channel via multiple antennas.

In LTE implementations orthogonal frequency division multiplexing is used for the downlink—that is, from the base station, access point or eNodeB to the terminal or UE. Use of OFDM meets the LTE requirement for spectrum flexibility and enables cost-efficient solutions for very wide carriers with high peak rates, and is a well-established technology, for example OFDM is used in standards such as IEEE 802.11a/g, 802.16, HIPERLAN-2, DVB and DAB.

Time frequency physical resource blocks (also denoted here in as resource blocks or "RBs" for brevity) may be defined in OFDM systems as groups of transport carriers (e.g. sub-carriers) or intervals that are assigned to transport data. The RBs are defined over a time and frequency period. Resource blocks are comprised of time-frequency resource elements (also denoted here in as resource elements or "REs" for brevity), which may be defined by indices of time and frequency in a slot. Additional details of LTE RBs and REs are described in 3GPP TS 36.211.

UMTS LTE supports scalable carrier bandwidths from 20 MHz down to 1.4 MHZ. In LTE, an RB is defined as 12 sub-carriers when the sub-carrier bandwidth is 15 kHz, or 24 sub-carriers when the sub-carrier bandwidth is 7.5 kHz. In an example implementation, in the time domain there is a defined radio frame that is 10 ms long and consists of 10 sub frames of 1 ms each. Every sub frame consists of 2 slots, where each slot is 0.5 ms. The subcarrier spacing in the frequency domain in this case is 15 kHz. +Twelve of these subcarriers together (per slot) constitutes an RB, so in this implementation one resource block is 180 kHz. 6 Resource blocks fit in a carrier of 1.4 MHz and 100 resource blocks fit in a carrier of 20 MHz.

In the downlink there are typically a number of physical channels as listed previously. In particular, the PDCCH is used for sending control, the PHICH for sending ack/nack, the PCFICH for specifying the number of control symbols, to Physical Downlink Shared Channel (PDSCH) for the data transmission, the Physical Multicast Channel (PMCH) for broadcast transmission using a Single Frequency Network, as well as the Physical Broadcast Channel (PBCH) for sending important system information within the cell. Supported modulation formats on the PDSCH in LTE are QPSK, 16QAM and 64QAM.

In the uplink there are typically three physical channels. While the Physical Random Access Channel (PRACH) is only used for initial access and when the UE is not uplink synchronized, the data is sent on the Physical Uplink Shared Channel (PUSCH). If there is no data to be transmitted on Uplink for a UE, control information would be transmitted on the Physical Uplink Control Channel (PUCCH). Supported modulation formats on the uplink data channel are QPSK, 16QAM and 64QAM.

If virtual MIMO/Spatial division multiple access (SDMA) is introduced the data rate in the uplink direction can be increased depending on the number of antennas at the base station. With this technology more than one mobile can reuse the same resources. For MIMO operation, a distinction is made between single user MIMO, for enhancing one user's data throughput, and multi user MIMO for enhancing the cell throughput.

In 3GPP LTE, a mobile station or device may be referred to as a "user device" or "user equipment" (UE). A base station may be referred to as an evolved NodeB or eNB. A semi-autonomous base station may be referred to as a home eNB or HeNB. An HeNB may thus be one example of an eNB. The HeNB and/or the coverage area of an HeNB may be referred to as a femtocell, an HeNB cell or a closed subscriber group (CSG) cell (where access is restricted).

Attention is now directed to FIG. 1, which shows a wireless communication system 100 with multiple user equipments (UEs) 104, a home evolved NodeB (HeNB) 110, an evolved NodeB (eNB) 102, a relay node 106, and a core or backhaul network 108. The eNB 102 may be the central base station in a wireless communication system. A UE 104 may also be called, and may contain some or all of the functionality of, a terminal, a mobile station, an access terminal, a subscriber unit, a station, etc. A UE 104 may be a cellular phone, a personal digital assistant (PDA), a wireless device, a wireless modem, a handheld device, a laptop computer, etc.

The core network 108 may be the central piece of a tele-communications network. For example, the core network 108 may facilitate communications with the Internet, other UEs, etc. A UE 104 may communicate with the core network 108 through an eNB 102 or an HeNB 110. Multiple UEs 104 may be in wireless communication with an eNB 102 or an HeNB 110.

The term "eNB" may be used to refer to the eNB 102 or to the HeNB 110, because the HeNB 110 may be considered to be one type of eNB. The eNB 102 may be referred to as a macro-eNB 102. A macro-eNB 102 may have a much larger range than an HeNB 110. Furthermore, a macro-eNB 102 may provide unrestricted access to UEs 104a subscribing to the core network 108. In contrast, an HeNB 110 may provide restricted access to UEs 104b belonging to a closed subscriber group (CSG). It may be assumed that a UE 104 may only communicate with a single eNB at a given time. Thus, a UE 104b communicating with an HeNB 110 may not simultaneously communicate with a macro-eNB 102.

The coverage area of an eNB may be referred to as a cell. Depending on sectoring, one or more cells may be served by the eNB. The coverage area of a macroeNB 102 may be referred to as a macrocell 112 or an eNB cell. Likewise, the coverage area of an HeNB 110 may be referred to as an HeNB-cell 114 or a femtocell. As shown in FIG. 1, the macrocell 112 may also be referred to as a "first wireless network" and an HeNB cell or femtocell may be referred to herein as a "second wireless network."

Multiple eNBs may have a backhaul connection with each other through the core network 108. For example, a backhaul connection may exist between the HeNB 110 and the eNB 102. In a backhaul connection, an eNB 102 may communicate 126 with the core network 108 and the core network 108 may correspondingly communicate 128 with the HeNB 110. A direct connection may also exist between multiple eNBs.

For example, a direct connection may exist between the HeNB 110 and the eNB 102. The direct connection may be an X2 connection 120. Details about an X2 interface may be found in, for example, 3GPP TS 36.423x2-AP. Multiple eNBs may also have a connection 122, 124 through use of a relay node 106. In one configuration, the relay node 106 may be the core network 108.

The coverage range for a macrocell 112 may be much larger than the coverage range for an HeNB-cell 114. In one configuration, the coverage range for a macrocell 112 may include the entire coverage range for an HeNB-cell 114.

A UE 104 may communicate with a base station (e.g., the eNB 102 or the HeNB 110) via transmissions on an uplink 116 and a downlink 118. The uplink 116 (or reverse link) refers to the communication link from the UE 104 to a base station, and the downlink 118 (or forward link) refers to the communication link from the base station to the UE 104. Thus, a UE 104a may communicate with the eNB 102 via the uplink 116a and downlink 118a. Likewise, a UE 104b may communicate with the HeNB 110 via the uplink 116b and downlink 118b.

The resources of the wireless communication system 100 (e.g., bandwidth and transmit power) may be shared among multiple UEs 104. A variety of multiple access techniques are known, including code division multiple access (CDMA), time division multiple access (TDMA), frequency division multiple access (FDMA), orthogonal frequency division multiple access (OFDMA), single-carrier frequency division multiple access (SC-FDMA), and so forth.

A UE 104a in wireless communication with a macrocell 112 may be referred to as a macro-UE 104a. A UE 104b in wireless communication with an HeNBcell may be referred to as an HeNB-UE 104b. In some configurations, one or more macro-UEs 104a located within an HeNB-cell 114 may cause interference so at to jam the HeNB-cell 114. For example, a macro-UE 104a located within an HeNB-cell 114 may cause interference for communications between an HeNB-UE 104b and the HeNB 110. Likewise, a macro-UE 104a within the HeNB-cell 114 may not have macrocell 112 coverage due to interference. Both uplink interference 130 and downlink interference 132 may occur.

If there are no UEs 104 in the CSG cell (e.g., HeNB cell 114), there may be no interference issues. In order to allow a successful initial access by a UE 104 to the CSG cell, the CSG cell may dynamically bias the open loop power control algorithm to balance the effect of high interference. CSG cells may also add noise to balance the uplink 116 and the downlink 118.

Inter-cell interference coordination (ICIC) may be used to prevent the uplink interference 130 and/or the downlink interference 132. Frequency ICIC may be feasible for both synchronous and asynchronous deployments. Time ICIC may be feasible in synchronized deployments. However, asynchronous deployments may require UE 104 feedback. Antenna techniques such as nulling interference from macro-cell UEs 104a may be used to control uplink inter-cell interference 130. Power control inter-cell interference coordination is described in U.S. patent application Ser. No. 12/423,498, the contents of which are incorporated by reference herein.

In one aspect, interference may be managed between a UE and a base station cell such as a femtocell node by determining information associated with the femtocell node at the UE and supplying the information to the femtocell node (e.g., HeNB). The information may include spatial channel information, power information, or other information associated with the femtocell or femtocell node. The UE may determine Reference Signal Received Power (RSRP), which for a particular cell may be the average power measured (and the average between receiver branches) of the resource elements that contain cell specific reference signals. The UE may also determine Reference Signal Received Quality (RSRQ) as the ratio of the RSRP and the E-UTRA Carrier Received Signal Strength Indicator (RSSI), for the reference signals. The UE may also determine other signal metrics. For example, the UE may determine power used (power contribution) for the resource elements that are used to transmit cell-specific reference signals from an eNB or HeNB (in the system bandwidth). The UE may also determine a Channel Quality Indicator (CQI), a Rank Indicator (RI), and a Precoding Matrix Indicator (PMI). The CQI provides information to the eNB or HeNB about the link adaptation parameters the UE can support at the time. The CQI is a table containing modulation and coding information. The RI is a UE recommendation for the number of layers, i.e, streams, to be used in spatial multiplexing. The UE may also determine received interference power per physical resource block, as well as thermal noise power over the system bandwidth.

Spatial channel information may be determined and composed in a measurement report to be sent to an eNB or HeNB. The spatial information and/or power information may then be used by the femtocell node to perform beamforming on output signals so at to mitigate interference with the UE. Information may be communicated directly to the interfering HeNB or may be relayed to the interfering HeNB via another eNB or HeNB using backhaul signaling.

In various implementations, power determination of the adjacent channel may be based on particular components or subcarriers of the adjacent channel signal, which may correspondingly be based on the adjacent network type. For example, the received power may be determined based on a particular subcarrier or signal in the adjacent channel, such as a pilot signal, with the determined power based on a measurement of the pilot signal. The pilot signal may be a pilot signal in a dedicated or allocated pilot sub-channel of the adjacent channel. For example, reference signals, as are defined with respect to LTE, may be used as a pilot signal and processed to determine power level. In UTRA implementations, alternate pilot signals are used and these may be used to determine adjacent network power metrics and levels.

In some implementations, an average or peak power level measurement may be made on the adjacent channel signal. This may be, for example, a power density determination made on the adjacent channel signal. Other power determinations may also be used and/or combined with those described above. For example, in one implementation, a power density measurement may be combined with a peak determination or pilot signal determination to generate a power level metric.

In some implementations, the received signal power level metric may be based on a Reference Signal Received Power (RSRP) per resource element, with the determining including determining the Reference Signal Received Power per resource element by measuring, at the node, a Reference Signal transmitted on one of the adjacent channels. In addition, the RSRP may be based on the average of RSRP per resource element across multiple transmit antennas, such as in a MIMO system.

Figure 2:
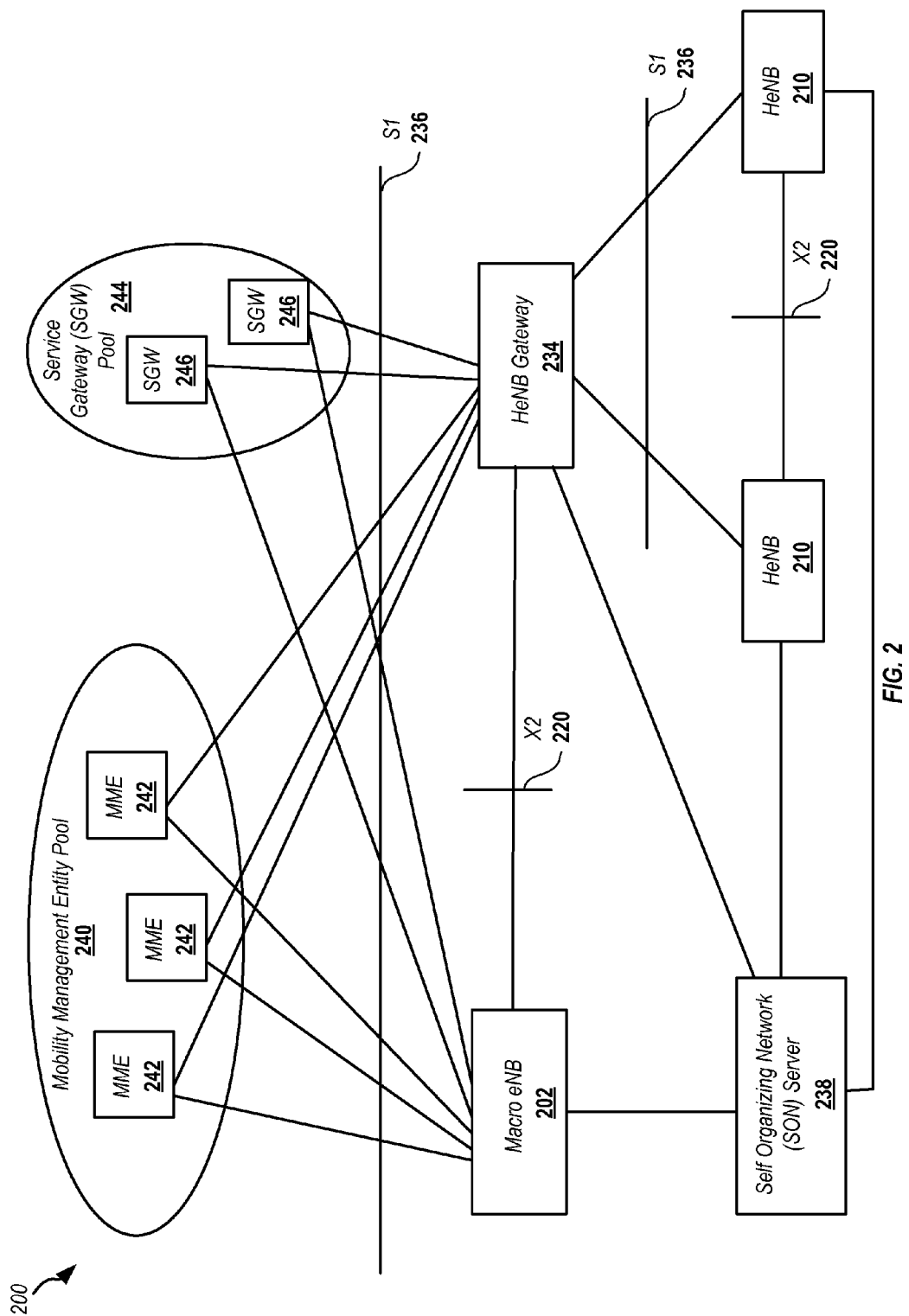
FIG. 2 illustrates details of a wireless communications system.

FIG. 2 illustrates a wireless communication system 200 with a macro-eNB 202 and multiple HeNBs 210. The wireless communication system 200 may include an HeNB gateway 234 for scalability reasons. The macro-eNB 202 and the HeNB gateway 234 may each communicate with a pool 240 of mobility management entities (MME) 242 and a pool 244 of serving gateways (SGW) 246. The HeNB gateway 234 may appear as a C-plane and a U-plane relay for dedicated 51 connections 236. An S1 connection 236 may be a logical interface specified as the boundary between an evolved packet core (EPC) and an Evolved Universal Terrestrial Access Network (EUTRAN). The HeNB gateway 234 may act as a macro-eNB 202 from an EPC point of view. The C-plane interface may be S1-MME and the U-plane interface may be S1-U.

The HeNB gateway 234 may act towards an HeNB 210 as a single EPC node. The HeNB gateway 234 may ensure S1-flex connectivity for an HeNB 210. The HeNB gateway 234 may provide a 1:n relay functionality such that a single HeNB 210 may communicate with n MMEs 242. The HeNB gateway 234 registers towards the pool 240 of MMEs 242 when put into operation via the S1 setup procedure. The HeNB gateway 234 may support setup of S1 interfaces 236 with the HeNBs 210.

The wireless communication system 200 may also include a self organizing network (SON) server 238. The SON server 238 may provide automated optimization of a 3GPP LTE network. The SON server 238 may be a key driver for improving operation and maintenance (O&M) to the wireless communication system 200. An X2 link 220 may exist between the macro-eNB 202 and the HeNB gateway 234. X2 links 220 may also exist between each of the HeNBs 210 connected to a common HeNB gateway 234. The X2 links 220 may be set up based on input from the SON server 238. An X2 link 220 may convey ICIC information. If an X2 link 220 cannot be established, the S1 link 236 may be used to convey ICIC information. Backhaul signaling may be used in communication system 200 to manage interference mitigation between macro-eNB 202 and HeNBs 210.

Figure 3:
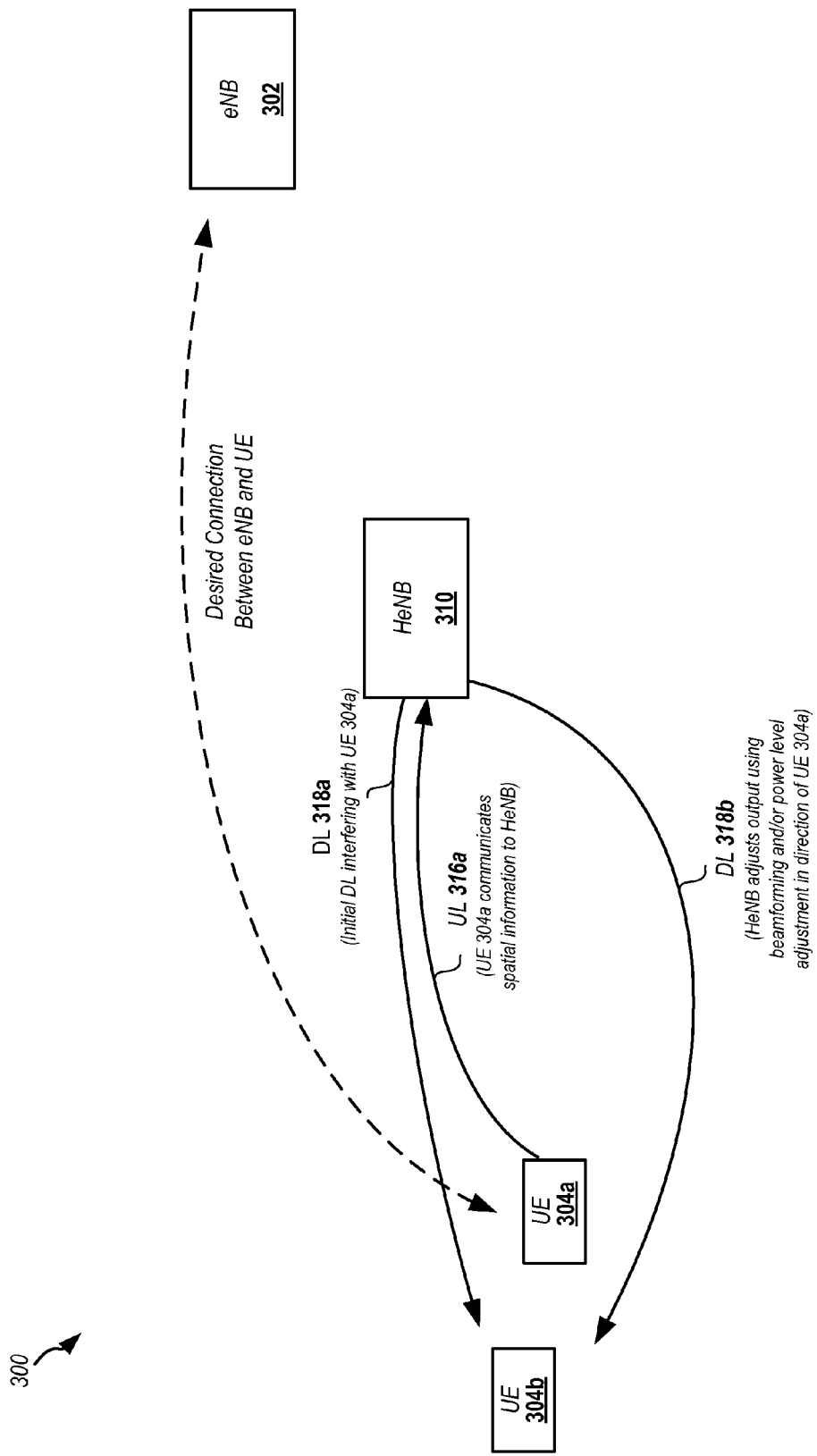
FIG. 3 is a diagram illustrating interference and example communication links for interference mitigation in a wireless communications system.
Figure 5:
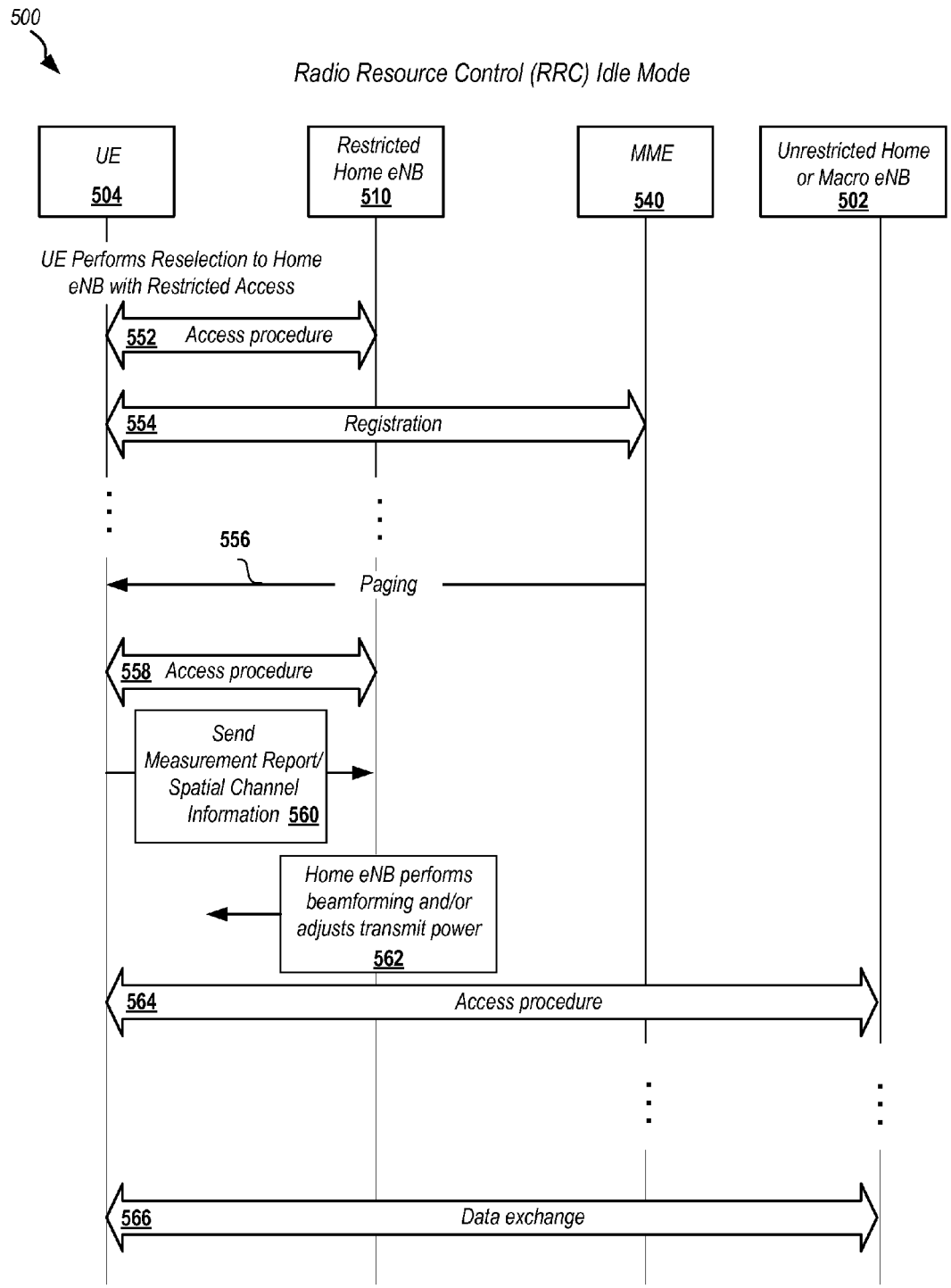
FIG. 5 is a diagram illustrating example signaling for multi-cell interference coordination and management in a Radio Resource Control (RRC) RRC_IDLE mode.

Attention is now directed to FIG. 3, which illustrates example communication links in a communication system 300 for use in interference coordination and mitigation. As shown in FIG. 3, an HeNB 310 may be generating interference, such as in DL 318a, with UE 304a, which may be associated with or attempting to communicate with a macrocell network associated with eNB 302. HeNB 310 may be a restricted node and may be in communication with a second UE, UE 304b, which may be a member of a closed subscriber group (CSG) associated with HeNB 310. UE 304a may not be a member of the CSG. In order to mitigate interference, UE 304a may receive a signal from HeNB 310, even if HeNB is restricted. This may be done, for example, as is shown in FIG. 5. UE 304a may then process a signal received from HeNB 310 to generate information associated with HeNB 310. This information may relate to power level transmitted by HeNB 310 and/or to spatial channel information associated with transmissions from HeNB 310. This information may comprise a measurement report, that may include power information, spatial channel information, and/or other signaling information obtained from signals received from HeNB 310.

UE 304a may then send the information associated with HeNB 310 to HeNB 310, such as by UL 316a. This may be done using signaling provided for communications between UEs and HeNBs in CSGs, such as is described in the 3GPP LTE specification. Upon receipt of the information, HeNB 310 may adjust the output signaling in the direction of UE 304a, such as in DL 318b, so as to mitigate interference between UE 304a and eNB 302. This may be done by adjusting power levels, resource block allocation, and/or by using beamforming to steer the output away from UE 304a. As is described in the 3GPP LTE specification, beamforming may be used to control signal transmission in LTE systems. Beamforming may be used by HeNB 310 based on information provided from UE 304a to reduce or minimize interference in the direction of UE 304a from HeNB 310. The UE 304a may also transmit a control signal to the interfering HeNB 310, notifying the HeNB 310 regarding a spatial dimension thereof that is creating interference. The spatial dimension can then be used to mitigate interference, such as by beamforming the output so as to steer it away from UE 304a.

Figure 4:
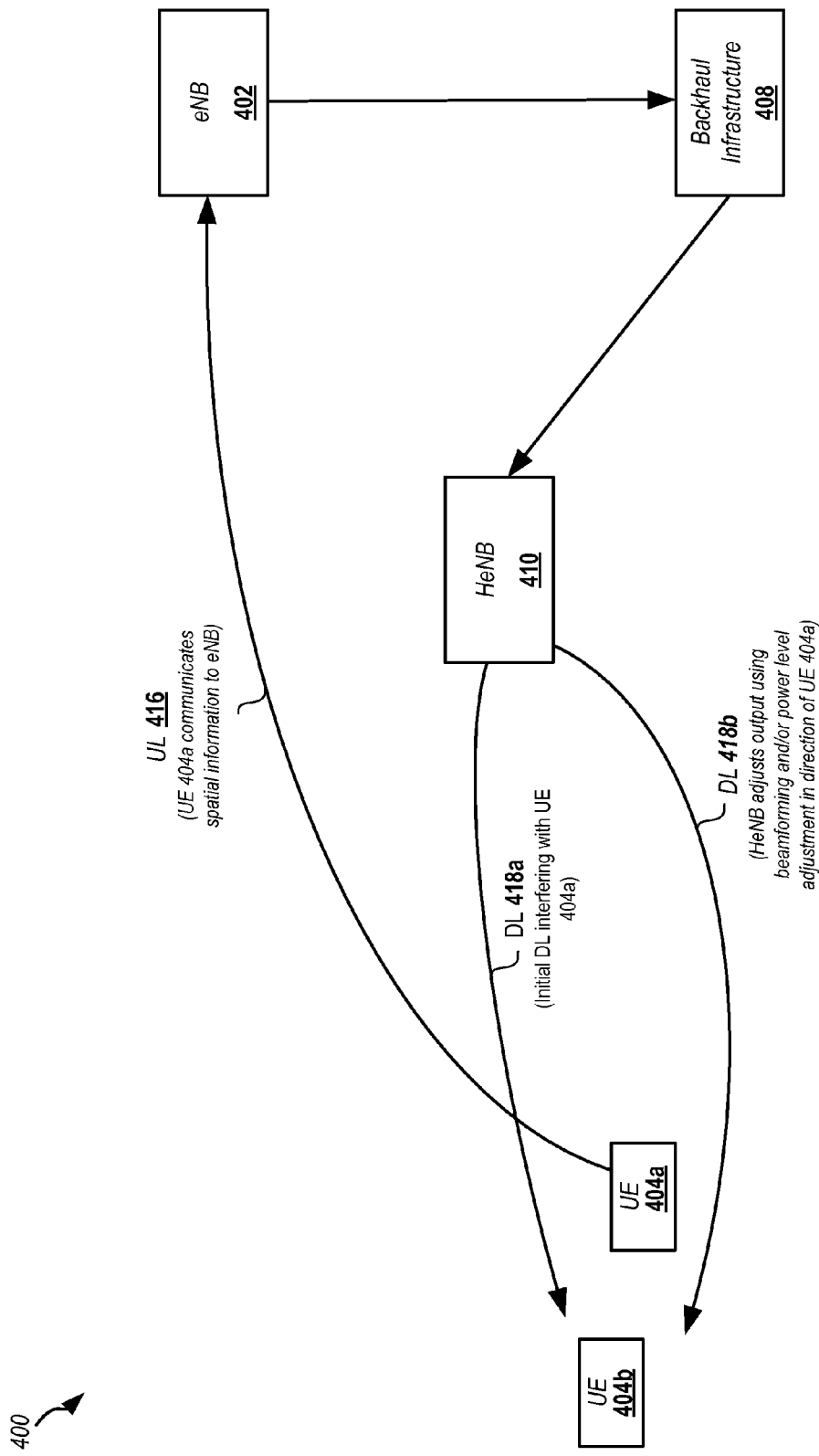
FIG. 4 is a diagram illustrating interference and example communication links for interference mitigation in a wireless communications system.

Attention is now directed to FIG. 4, which illustrates other example communication links in a communication system 400 for use in interference coordination and management. As shown in FIG. 4, an HeNB 410 may be generating interference, such as in DL 418a, with UE 404a, which may be operating in a macrocell network associated with eNB 402. HeNB 410 may be in communication with a second UE, UE 404b, which may be a member of a CSG associated with HeNB 410. UE 304a may not be a member of the CSG. In order to mitigate interference, UE 404a may receive a signal from HeNB 410, even if HeNB is associated with a CSG. UE 404a may then process the signal to generate information associated with HeNB 410. This information may relate to power level transmitted by HeNB 410 and/or to spatial information associated with transmissions from HeNB 410. This information may comprise a measurement report, that may include power information, spatial information, and/or other signaling information obtained from signaling received from HeNB 410.

UE 404a may then send the information associated with HeNB 410 to eNB 402, such as by UL 416. Upon receipt of the information, eNB 402 may send the information, via backhaul structure 408, to HeNB 410. The backhaul structure may be as shown in FIG. 2. Upon receipt of the information, HeNB may adjust the output signaling in the direction of UE 404a, such as in DL 418b, so as to mitigate interference between UE 404a and eNB 402 caused by HeNB 410. This may be done by adjusting power levels, resource block allocation, and/or by using beamforming. As is described in the 3GPP LTE specification, beamforming may be used to control signal transmission in LTE systems. Beamforming may be used by HeNB 410 based on information provided from UE 404a to reduce or minimize interference in the direction of UE 404a by steering the output away from UE 404a. In addition, UE 404a may request a gap in transmission from eNB 402. In this case, spatial channel information, power level information or other signaling information may be determined by UE 404a in the absence of signaling from eNB 402.

In LTE systems there are only two RRC states, RRC_IDLE and RRC_CONNECTED. In the RRC_IDLE state, the UE monitors a paging channel to detect incoming calls, performs neighboring cell measurements and measurement reporting and acquires system information. In RRC_IDLE state, for example, a UE in restricted cell coverage may not have non-restricted cell (e.g., eNB or non-restricted HeNB) coverage due to interference. In this state, a UE may reselect a restricted cell that it does not subscribe to, and if the non-restricted cell is not suitable or available, the UE registers with the restricted cell.

For example, FIG. 5 illustrates example signal flow 500 for interference coordination and management in a communications system, such as in system 300 of FIG. 3, in an RRC_IDLE state. In this configuration, the UE may be unable to connect with an associated macrocell eNB (or other femto cell HeNB), such as, for example, if interference from HeNB 510 is too large. UE 504 may initiate interference coordination and mitigation by performing an access procedure 552 to access HeNB 510, which may be a restricted HeNB associated with a CSG. UE 504 may then initiate a registration process 554 with a Mobility Management Entity (MME). MME 540 may then initiate paging 556 with UE 504, with UE 504 then initiating an access procedure 558 with HeNB 510. HeNB 504 may then send 560 a measurement report, which may include power or signal strength information, spatial information, or other signal information, to HeNB 510. HeNB 510 may then adjust output signaling 562, such as by adjusting output power level and/or beamforming in the direction of UE 504. Subsequent to output signaling adjustment at HeNB 510, UE 504 may then initiate an access procedure 564 with eNB 502 in a reduced interference environment. Subsequent to access, UE 504 may then further communication with eNB 502, such as by exchanging data 566.

In RRC_CONNECTED state, there is a connection established with a network (e.g., RRC connection is established from a UE to an eNB). This allows for transfer of unicast data to/from a UE, with the UE monitoring control channels associated with the shared data channel to determine if data is scheduled, providing channel quality and feedback information, performing neighbor cell measurements and measurement reporting, as well as acquiring system information.

Figure 6:
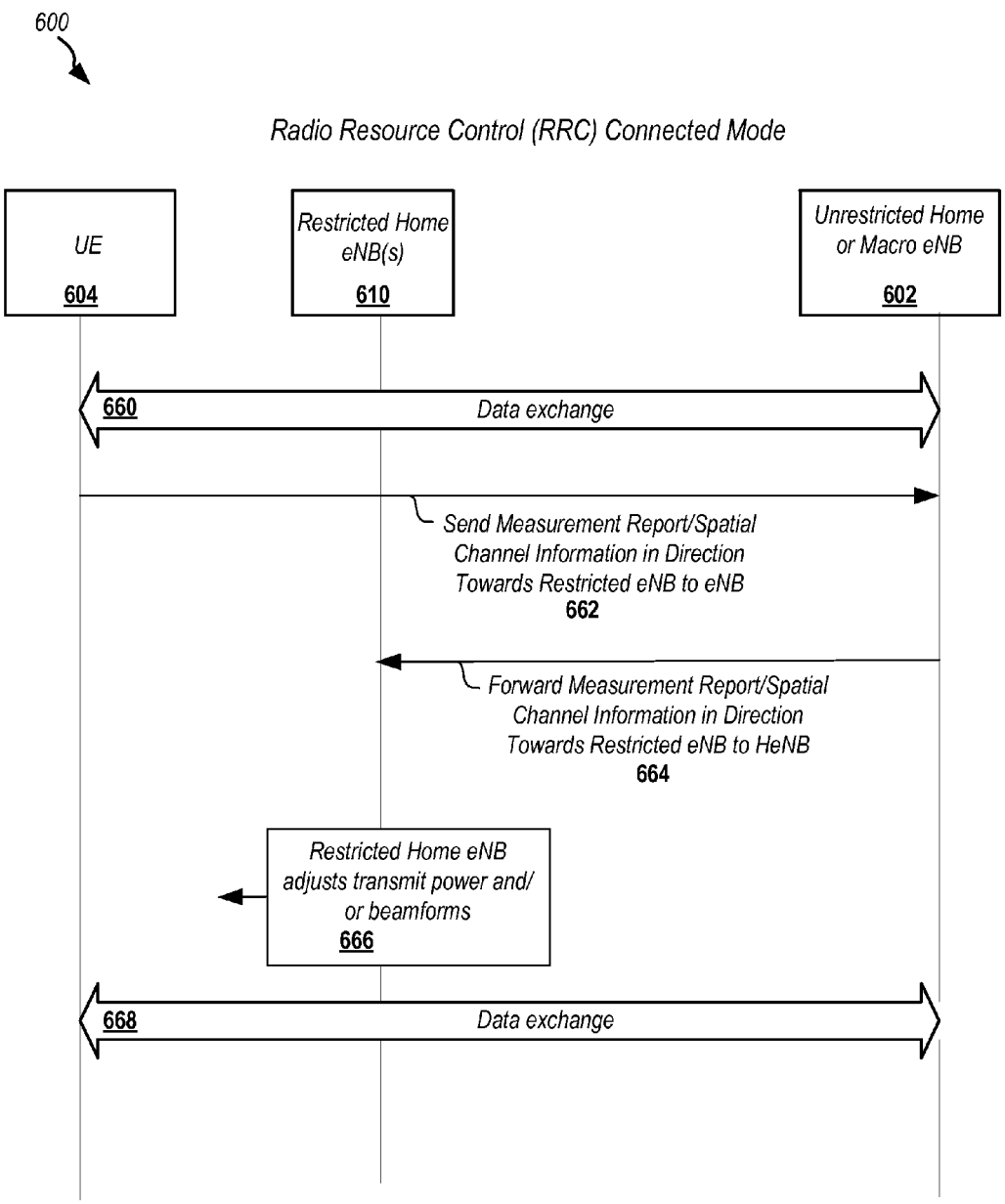
FIG. 6 is a diagram illustrating example signaling for multi-cell interference coordination and management in an RRC_CONNECTED mode.

FIG. 6 illustrates an example signal flow 600 for interference coordination and mitigation in a communications system, such as in system 400 of FIG. 4, in an RRC_CONNECTED state. A UE 604 connected with eNB 602 (and, for example, exchanging data 660), may initiate interference coordination with respect to interfering HeNB(s) by, for example, receiving signals from one or more HeNBs 610, which may be restricted HeNB(s), and generating a measurement report, that may include signal power information, spatial channel information, and/or other signaling information associated with HeNB(s) 610. The information may be sent 662 to eNB 602, which may then forward the information to HeNB(s) 610, such as by using backhaul signaling. This may be done such as is shown in FIG. 1 and FIG. 2.

Upon receipt of the information, HeNB(s) 610 may then adjust output 666, such as by adjusting transmit output power, resource block allocation, and or by beamforming, so as to mitigate interference in the direction(s) of UE 604. UE 604 may then continue communication with eNB 602, such as by further exchanging data 668, in a reduced interference environment.

Figure 7:
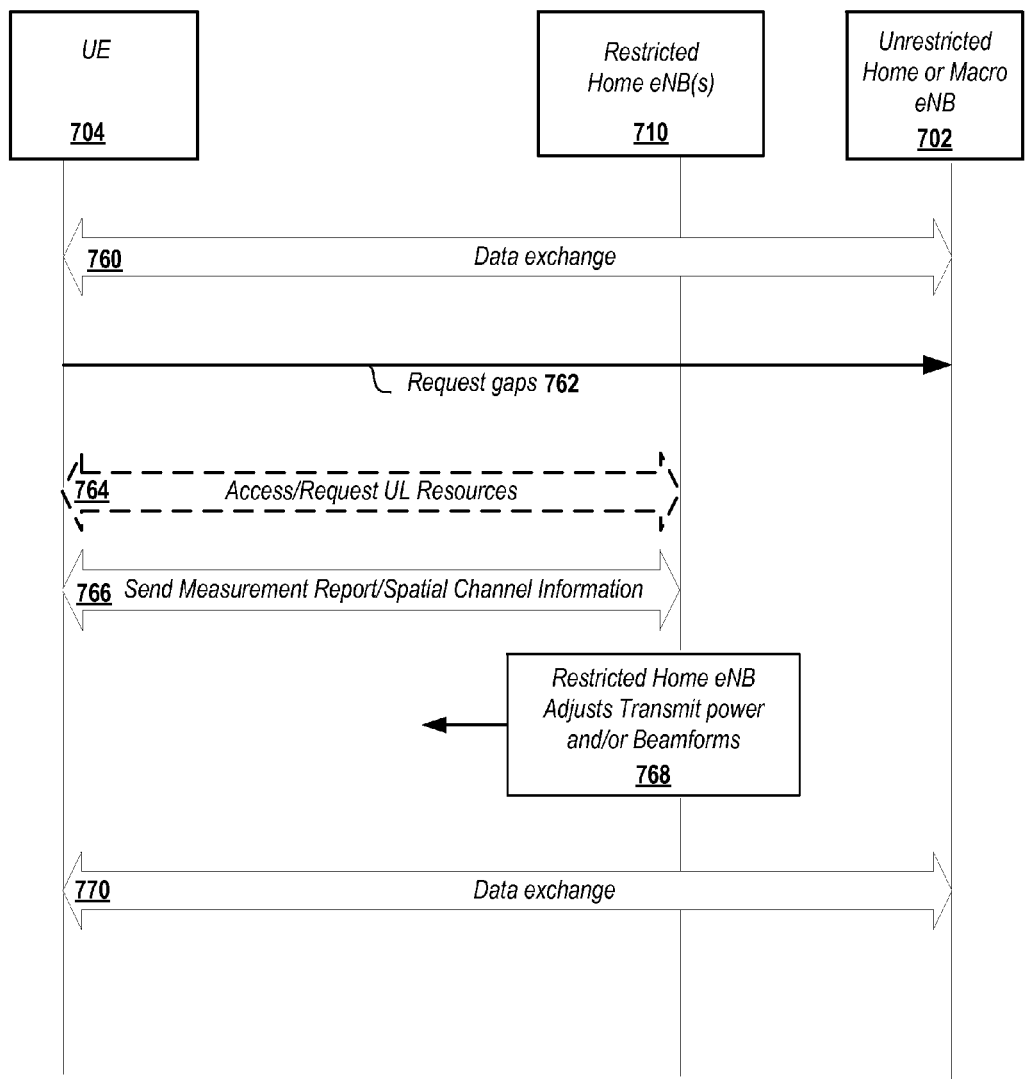
FIG. 7 is a diagram illustrating example signaling for multi-cell interference coordination and management in an RRC_CONNECTED mode.

FIG. 7 illustrates another example signal flow 700 for interference coordination and management in a communications system, such as in system 400 of FIG. 4, in an RRC_CONNECTED state. As shown in FIG. 7, a UE 704 may be in communication with an eNB 702, such as by exchanging data 760. Rather than communicating the measurement report/spatial information to eNB 702 for forwarding via a backhaul connection as shown in FIG. 6, the UE may instead communicate directly with the intefering HeNB 710 to transfer information for interference mitigation.

UE 704 may initiate interference mitigation by requesting a gap 762 with eNB 702 via gap scheduling. This may be, for example, requesting gaps in resource blocks associated with transmission from eNB 702 to UE 704. UE 704 may then generate information, such as a measurement report associated with signaling from interfering HeNB 710, during a transmission gap from eNB 702. UE 704 may then initiate connection with HeNB 710, such as by using a dedicated control channel established with HeNB 710. UE 704 may then send information 766, such as a measurement report, to HeNB(s) 710. The measurement report may contain signaling information such as power information, spatial information, or other signaling information associated with HeNB(s) 710. After receipt of the information, HeNB(s) 710 may then adjust output 768, such as by adjusting transmit output power, resource block allocation, and/or beamforming, so as to mitigate interference in the direction of UE 704. UE 704 may then resume 770 data exchange with eNB 702 in a reduced interference environment.

In some implementations, for UE originated calls the UE can access a restricted cell (e.g., an HeNB femtocell), such as via a control channel, and can report signal strength, spatial information or other signaling information from the restricted cell and any additionally detected macrocells or other femtocells. In response, the HeNB may perform beamforming and/or may reduce power to mitigate interference with the UE. In addition, when radio conditions towards the non-restricted cell (e.g., eNB macrocell) are strong, the UE can notify the restricted cell regarding which cell the UE desires to access. Further, the HeNB can further direct the UE to the non-restricted cell and/or terminate signaling with the UE, such as by sending a termination request.

For UE terminated calls, the UE may be paged on a last register restricted cell and macro network tracking area. The UE can then access the restricted cell, and any macrocell it may detect. In this case, the restricted cell may use beamforming and/or reduce power to reduce interference to the UE. In addition, when radio conditions towards the restricted cell are sufficiently good, the UE may notify the restricted cell(s) that it desires to access. Additionally, the restricted cell eNB can further direct the UE to access a non-restricted cell (e.g., a macrocell) and/or terminate signaling with the UE, such as by sending a termination request.

In various implementations, requirements may include: providing access to a restricted cell if another non-restricted cell is not suitable; there is an absence of other available frequency or frequencies; connection fails with a non-restricted cell and absence of other available frequencies. These conditions may impose requirement on restricted cells (e.g., HeNBs) to respond to a UE subject to interference, based on a provided measurement report/spatial channel information, to provide output power control and/or perform beamforming.

Figure 8:
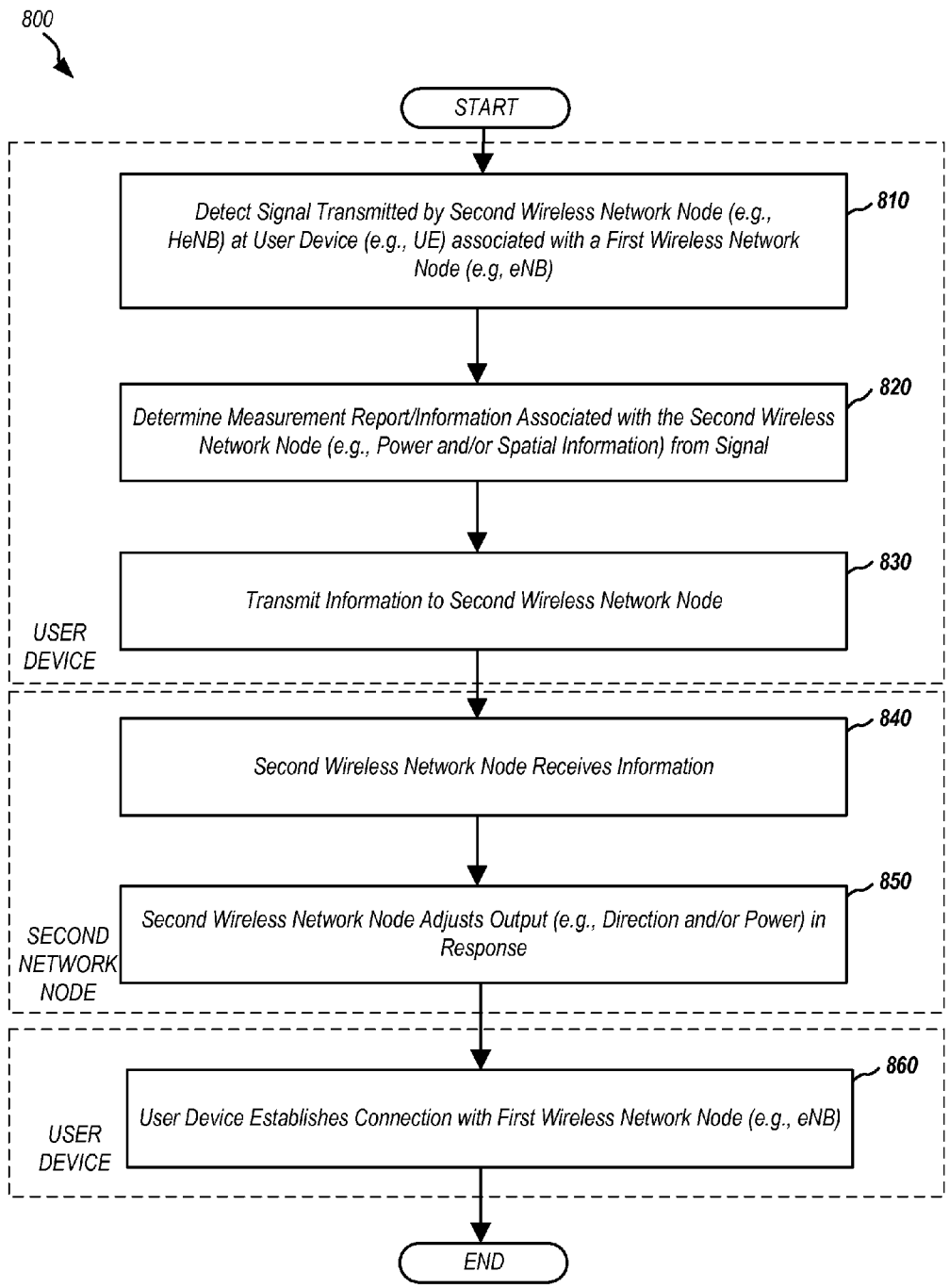
FIG. 8 is an example process for interference coordination in a multi-cell wireless communications system.

Attention is now directed to FIG. 8, which illustrates an exemplary process 800 between a user device (e.g., UE) and network node (e.g., HeNB) for interference coordination and mitigation in a wireless communications system, such as in an RRC_IDLE state. These may be devices such as are shown in FIGS. 3 and 5. At stage 810, a user device associated with a first wireless network, such as a macrocell (e.g., eNB), may detect a signal transmitted from a second wireless network node, such as a femtocell node (e.g., an HeNB). The user device will generally not be in communication with the first wireless network, but may previously have been in communication or may desire to be in communication. Based on the received signal, the user device may determine information associated with the second wireless network node, such as power level, signaling information, spatial information, etc, at stage 820. The user device may then transmit the information, such as in a measurement report, to the second wireless network node at stage 830. The second wireless network node may be a restricted node, such as in a CSG. The UE may not be subscribed to the CSG.

The second wireless network node may then receive the information at stage 840. Based on the received information, the second wireless network node may then adjust its output, such as, for example, by adjusting output power and/or by beamforming at stage 850. The adjustment may be made based on output signal adjustment data or information generated in the second wireless network node based on the received information. The output may be adjusted so as to reduce or minimize interference in the direction of the user device, such as, for example, by beamforming the output so as to minimize signaling in the direction of the user device. Subsequent to reduction of power from the second wireless network node, the user device may then establish a connection at stage 860 with the first wireless network, which may be in a reduced interference environment.

Figure 9:
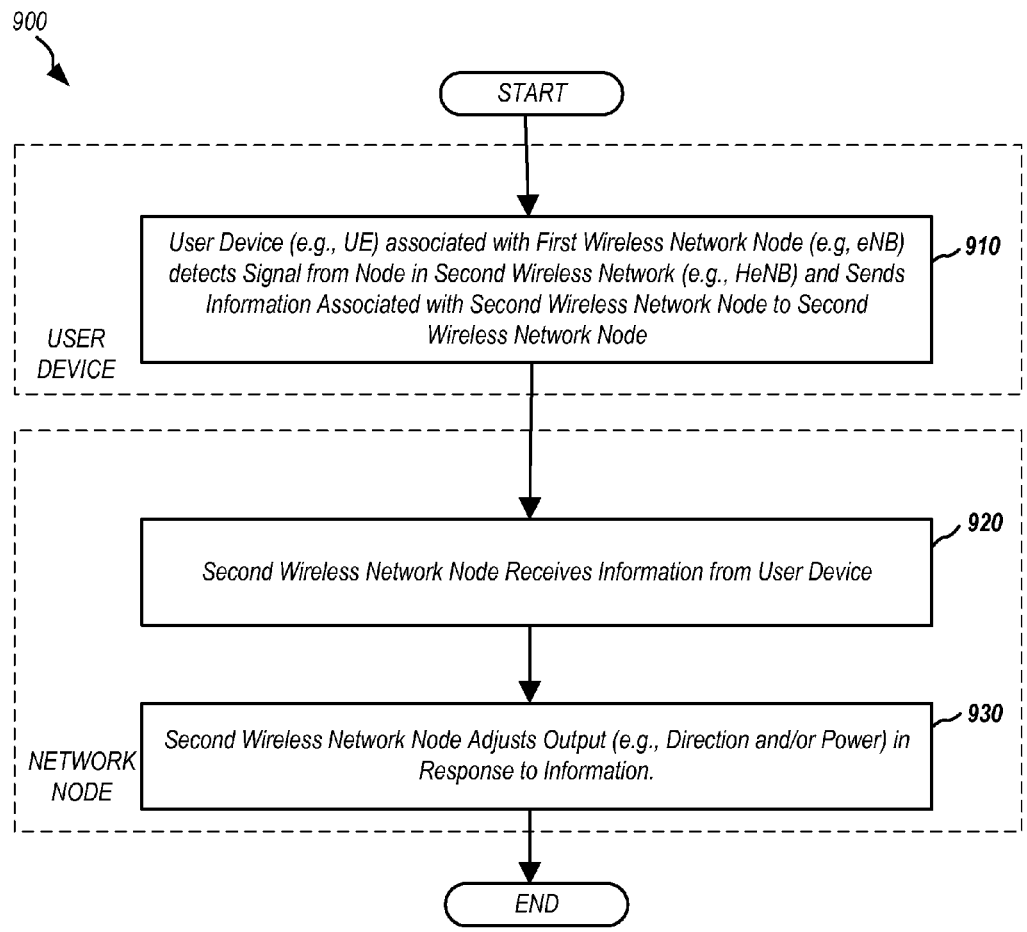
FIG. 9 is an example process for interference coordination in a multi-cell wireless communications system.

Attention is now directed to FIG. 9, which illustrates an example process 900 between a user device and network node for interference coordination and mitigation in a wireless communications system. At stage 910, a user device associated with a first wireless network, such as a macrocell, may detect a signal transmitted from a second wireless network node, such as a femtocell node (e.g., an HeNB). The second wireless network node may be a restricted node associated with a CSG. Based on the received signal, the user device may generate a measurement report which may include information associated with the second wireless network node, such as power level, signaling information, spatial information, etc. The user device may then transmit the information to the second wireless network node.

The second wireless network node may receive the information at stage 920. Based on the received information, the second wireless network node may then adjust its output, such as, for example, by adjusting output power and/or by beamforming, at stage 930. The output may be adjusted so as to reduce or minimize interference in the direction of the user device, such as, for example, by beamforming the output so as to minimize signaling in the direction of the user device.

Figure 10:
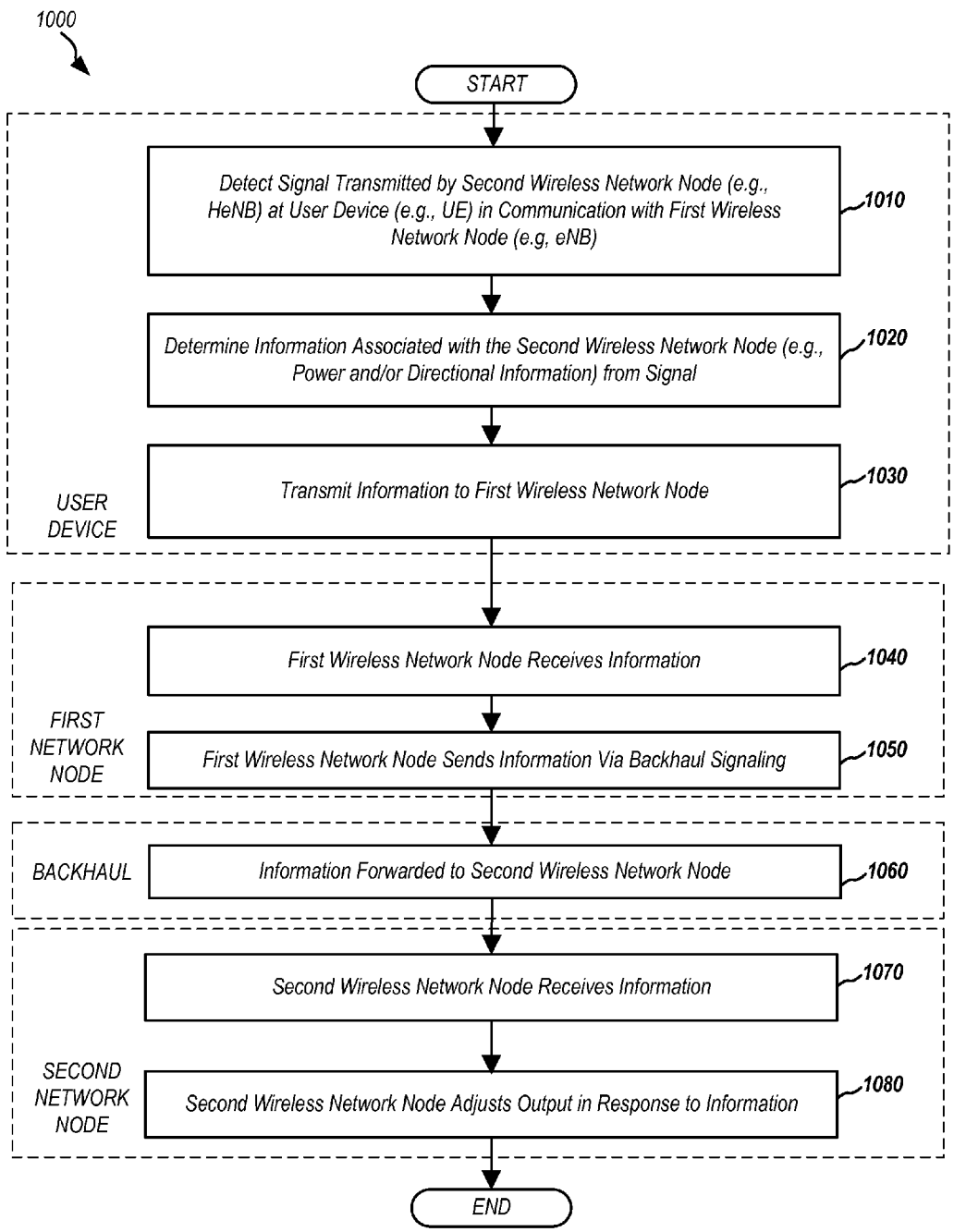
FIG. 10 is an example process for interference coordination in a multi-cell wireless communications system.

Attention is now directed to FIG. 10, which illustrates an example process 1000 between a user device, a first and a second network node, and a backhaul network for interference coordination and management in a wireless communications system. At stage 1010, a user device associated with a first wireless network, such as a macrocell, may detect a signal transmitted from a second wireless network node, such as a femtocell node (e.g., an HeNB). The user device may be in communication with the first wireless network node, such as via standard data and control communication links. Based on the received signal, the user device may determine information associated with the second wireless network node, such as power level, signaling information, spatial information, etc at stage 1020. The user device may then transmit the information to the first wireless network node at stage 1030.

The first wireless network node may receive the information at stage 1040. The first wireless network node may then send the information to the second wireless network node at stage 1050. This may be done by backhaul signaling 1060, such as is shown in FIGS. 1 and 2. The second wireless network node may receive the information at stage 1070. Based on the received information, the second wireless network node may then adjust its output, such as, for example, by adjusting output power and/or by beamforming, at stage 1080. The adjustment may be made based on output signal adjustment data or information generated in the second wireless network node based on the received information. The output may be adjusted so as to reduce or minimize interference in the direction of the user device, such as, for example, by beamforming the output so as to minimize signaling in the direction of the user device. In some cases, the adjusting may be performed further based on a metric associated with the first wireless network, such as a power level metric. For example, in some implementations, the adjusting may be done only when an RSRP of the first network is below a predefined threshold. In some implementations, the adjusting may be done only when an RSRQ of the first network is below a minimum threshold. Information regarding the first wireless network metric may be sent from the UE to the HeNB.

Figure 11:
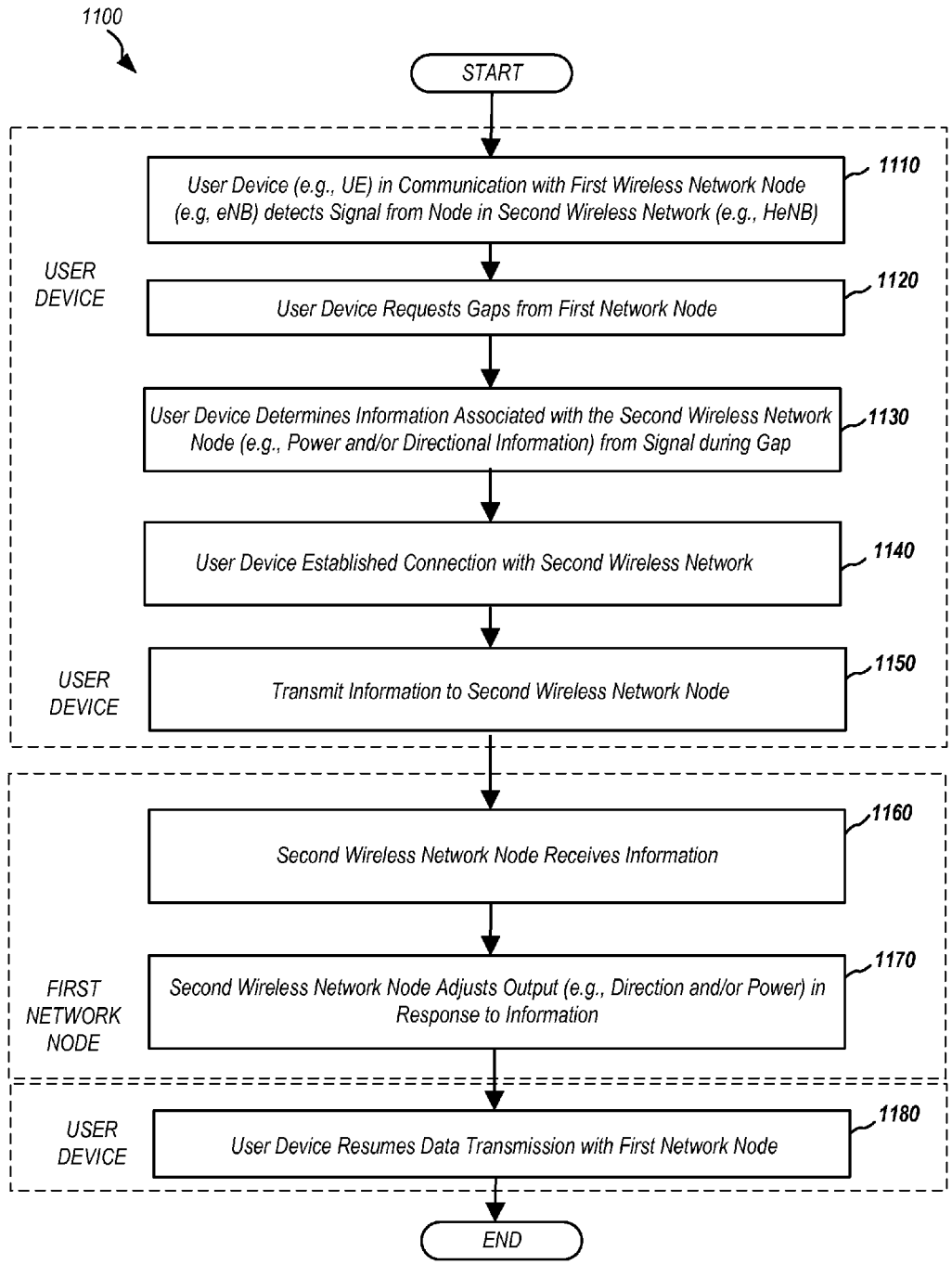
FIG. 11 is an example process for interference coordination in a multi-cell wireless communications system.

Attention is now directed to FIG. 11, which illustrates an example process 1100 between a user device, a first and a second network node, and a backhaul network for interference coordination and management in a wireless communications system. At stage 1010, a user device associated with a first wireless network, such as a macrocell, may detect a signal transmitted from a second wireless network node, such as a femtocell node (e.g., an HeNB). The user device may be in communication with the first wireless network node, such as via standard data and control communication links. Based on the received signal, the user device may determine information associated with the second wireless network node, such as power level, signaling information, spatial information, etc at stage 1020. The user device may then transmit the information to the first wireless network node at stage 1030.

The first wireless network node may receive the information at stage 1040. The first wireless network node may then send the information to the second wireless network node at stage 1050. This may be done by backhaul signaling 1060, such as is shown in FIGS. 1 and 2. The second wireless network node may receive the information at stage 1070. Based on the received information, the second wireless network node may then adjust its output, such as, for example, by adjusting output power and/or by beamforming, at stage 1080. The adjustment may be made based on output signal adjustment data or information generated in the second wireless network node based on the received information. The output may be adjusted so as to reduce or minimize interference in the direction of the user device, such as, for example, by beamforming the output so as to minimize signaling in the direction of the user device. the first wireless network, such as a power level metric. For example, in some implementations, the adjusting may be done only when an RSRP of the first network is below a predefined threshold. In some implementations, the adjusting may be done only when an RSRQ of the first network is below a minimum threshold. Information regarding the first wireless network metric may be sent from the UE to the HeNB.

Figure 12:
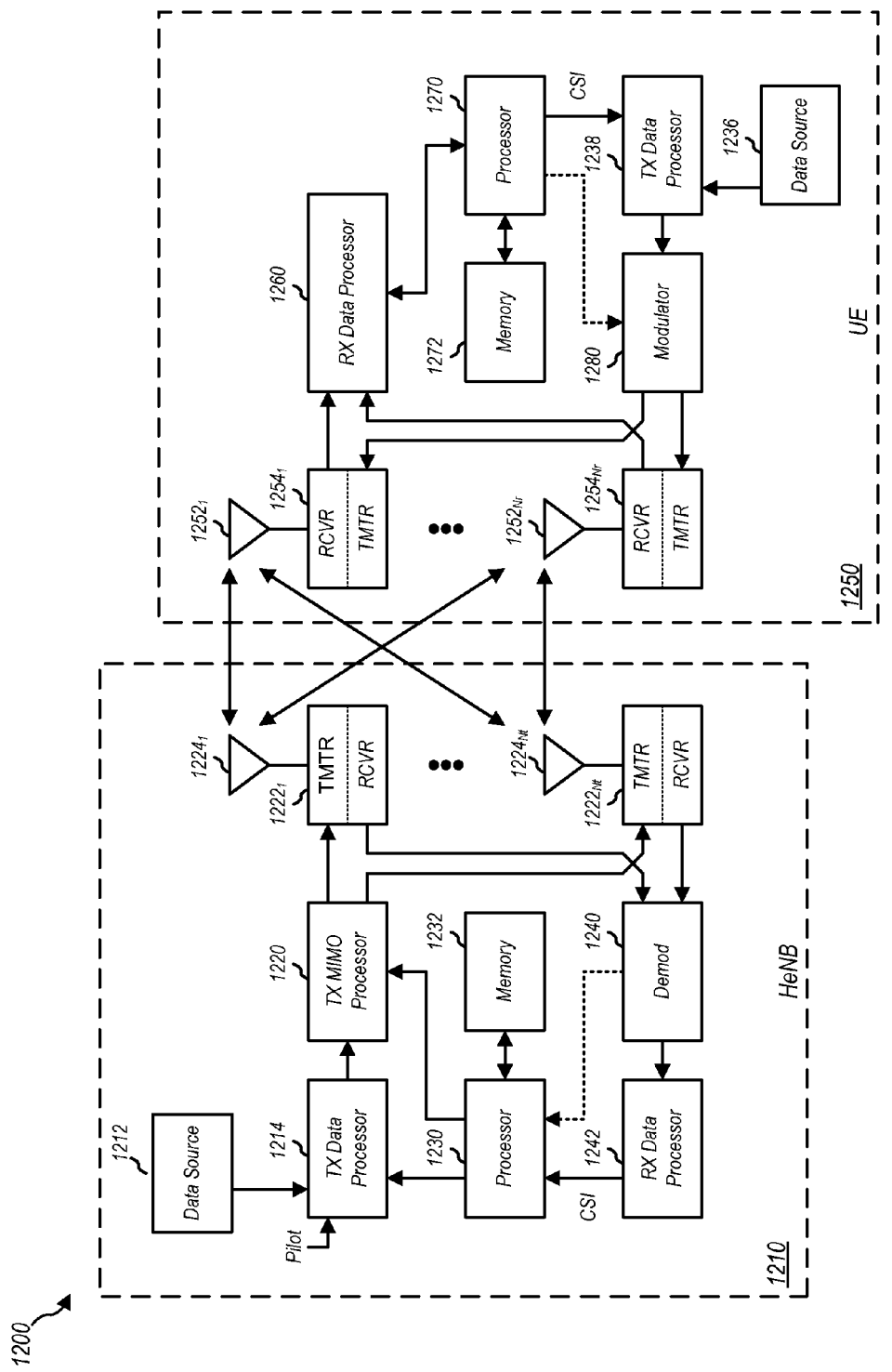
FIG. 12 is a block diagram of an embodiment of communication system components.

Attention is now directed to FIG. 12, which illustrates a block diagram of an embodiment of a transmitter system 1210 (i.e., an eNB or HeNB) and a receiver system 1250 (i.e., a terminal or UE) in an example LTE MIMO communication system 1200. These systems may correspond to those shown in FIGS. 1-4, and may be configured to implement the processes illustrated in FIGS. 5-11. As noted previously herein, receiving interfering signals, determining information associated with the interfering signals, sending this information to the interfering device, and adjusting transmitted output, such as by power level adjustment and/or by beamforming as described herein may provide advantages in various LTE system implementations, as well as in other systems.

Power level and/or beamforming data may be generated in one or more modules of HeNB 1210 for controlling signal transmission. UE 1250 may include one or more modules to receive signals from HeNB 1210 to determine channel characteristics, demodulate received data and generate spatial information, power level information, and/or other information associated with HeNB 1210. In one embodiment, HeNB 210 may perform power level adjustment and/or beamforming in response to information received from UE 1250 or from backhaul signaling as described previously herein (not shown in FIG. 12). This may be done in one or more components (or other components not shown) of HeNB 1210, such as processors 1214, 1230 and memory 1232. HeNB 1210 may also include a transmit module including one or more components (or other components not shown) of HeNB 1210, such as transmit modules 1224. HeNB 1210 may also include a beamforming module including one or more components (or other components not shown) of HeNB 1210.

Likewise, UE 1250 may include a receive module including one or more components of UE 1250 (or other components not shown), such as receivers 1254. UE 1250 may also include a signal information module including one or more components (or other components not shown) of UE 1250, such as processors 1260 and 1270, and memory 1272. In one embodiment, one or more signals received at UE 1250 are processed to estimate power information, spatial information and/or other information regarding corresponding HeNBs, such as HeNB 1210. Memories 1232 and 1272 may be used to store computer code for execution on one or more processors to implement processes associated with beamforming, power level and/or spatial information determination as are described herein.

In operation, at the transmitter system 1210, traffic data for a number of data streams may be provided from a data source 1212 to a transmit (TX) data processor 1214, where it may be processed and transmitted to one or more receiver systems 1250. The transmitted data may be beamformed so as to mitigate interference in the direction of one or more UEs 1250.

In one embodiment, each data stream is processed and transmitted over a respective transmitter sub-system (shown as transmitters $1224_1$-$1224_{Nt}$) of transmit system 1210. TX data processor 214 receives, formats, codes, and interleaves the traffic data for each data stream based on a particular coding scheme selected for that data stream so as to provide coded data. In particular, transmit system 1210 may be configured to determine a particular reference signal and reference signal pattern and provide a transmit signal including the reference signal and/or beamforming information in the selected pattern.

The coded data for each data stream may be multiplexed with pilot data using OFDM techniques. The pilot data is typically a known data pattern that is processed in a known manner and may be used at the receiver system to estimate the channel response. For example, the pilot data may comprise a reference signal. Pilot data may be provided to TX data processor 1214 as shown in FIG. 12 and multiplexed with the coded data. The multiplexed pilot and coded data for each data stream may then be modulated (i.e., symbol mapped) based on a particular modulation scheme (e.g., BPSK, QSPK, M-PSK, M-QAM, etc.) selected for that data stream so as to provide modulation symbols, and the data and pilot may be modulated using different modulation schemes. The data rate, coding, and modulation for each data stream may be determined by instructions performed by processor 1230 based on instructions stored in memory 1232, or in other memory or instruction storage media of transmit system 1250 (not shown).

The modulation symbols for all data streams may then be provided to a TX MIMO processor 1220, which may further process the modulation symbols (e.g., for OFDM implementation). TX MIMO processor 1220 may then provide Nt modulation symbol streams to $N_t$ transmitters (TMTR) $1222_1$ through $1222_{Nt}$. The various symbols may be mapped to associated RBs for transmission.

TX MIMO processor 1220 may apply beamforming weights to the symbols of the data streams and corresponding to the one or more antennas from which the symbol is being transmitted. This may be done by using information such as channel estimation information provided by or in conjunction with the reference signals and/or spatial information provided from a network node such as a UE. For example, a beam B=transpose([b1 b2 . . . $b_{Nt}$]) composes of a set of weights corresponding to each transmit antenna. Transmitting along a beam corresponds to transmitting a modulation symbol x along all antennas scaled by the beam weight for that antenna; that is, on antenna t the transmitted signal is bt*x. When multiple beams are transmitted, the transmitted signal on one antenna is the sum of the signals corresponding to different beams. This can be expressed mathematically as B1x1+B2x2+$BN_S \times N_S$, where $N_S$ beams are transmitted and xi is the modulation symbol sent using beam Bi. In various implementations beams could be selected in a number of ways. For example, beams could be selected based on channel feedback from a UE, channel knowledge available at the eNB, or based on information provided from a UE to facilitate interference mitigation, such as with an adjacent macrocell.

Each transmitter sub-system $1222_1$ through $1222_{Nt}$ receives and processes a respective symbol stream to provide one or more analog signals, and further conditions (e.g., amplifies, filters, and upconverts) the analog signals to provide a modulated signal suitable for transmission over the MIMO channel. $N_t$ modulated signals from transmitters $1222_1$ through $1222_{Nt}$ are then transmitted from $N_t$ antennas $1224_1$ through $1224_{Nt}$, respectively.

At receiver system 1250, the transmitted modulated signals are received by $N_r$ antennas $1252_1$ through $1252_{Nr}$ and the received signal from each antenna 1252 is provided to a respective receiver (RCVR) $1254_1$ through $1252_{Nr}$. Each receiver 1254 conditions (e.g., filters, amplifies and downconverts) a respective received signal, digitizes the conditioned signal to provide samples, and further processes the samples to provide a corresponding "received" symbol stream.

An RX data processor 1260 then receives and processes the $N_r$ received symbol streams from $N_r$ receivers $1254_1$ through $1252_{Nr}$ based on a particular receiver processing technique so as to provide $N_S$ "detected" symbol streams so at to provide estimates of the $N_S$ transmitted symbol streams. The RX data processor 1260 then demodulates, deinterleaves, and decodes each detected symbol stream to recover the traffic data for the data stream. The processing by RX data processor 1260 is typically complementary to that performed by TX MIMO processor 1220 and TX data processor 1214 in transmitter system 1210.

A processor 1270 may periodically determine a precoding matrix for use as is described further below. Processor 1270 may then formulate a reverse link message that may comprise a matrix index portion and a rank value portion. In various embodiments, the reverse link message may comprise various types of information regarding the communication link and/or the received data stream. The reverse link message may then be processed by a TX data processor 1238, which may also receive traffic data for a number of data streams from a data source 1236 which may then be modulated by a modulator 1280, conditioned by transmitters $1254_1$ through $1254_{Nr}$, and transmitted back to HeNB 1210. Information transmitted back to HeNB 1210 may include power level and/or spatial information for providing beamforming to mitigate interference from HeNB 1210.

At HeNB 1210, the modulated signals from receiver system 1250 are received by antennas 1224, conditioned by receivers 1222, demodulated by a demodulator 1240, and processed by an RX data processor 1242 to extract the message transmitted by the receiver system 1250. Processor 1230 then determines which pre-coding matrix to use for determining beamforming weights, and then processes the extracted message.

Figure 13:
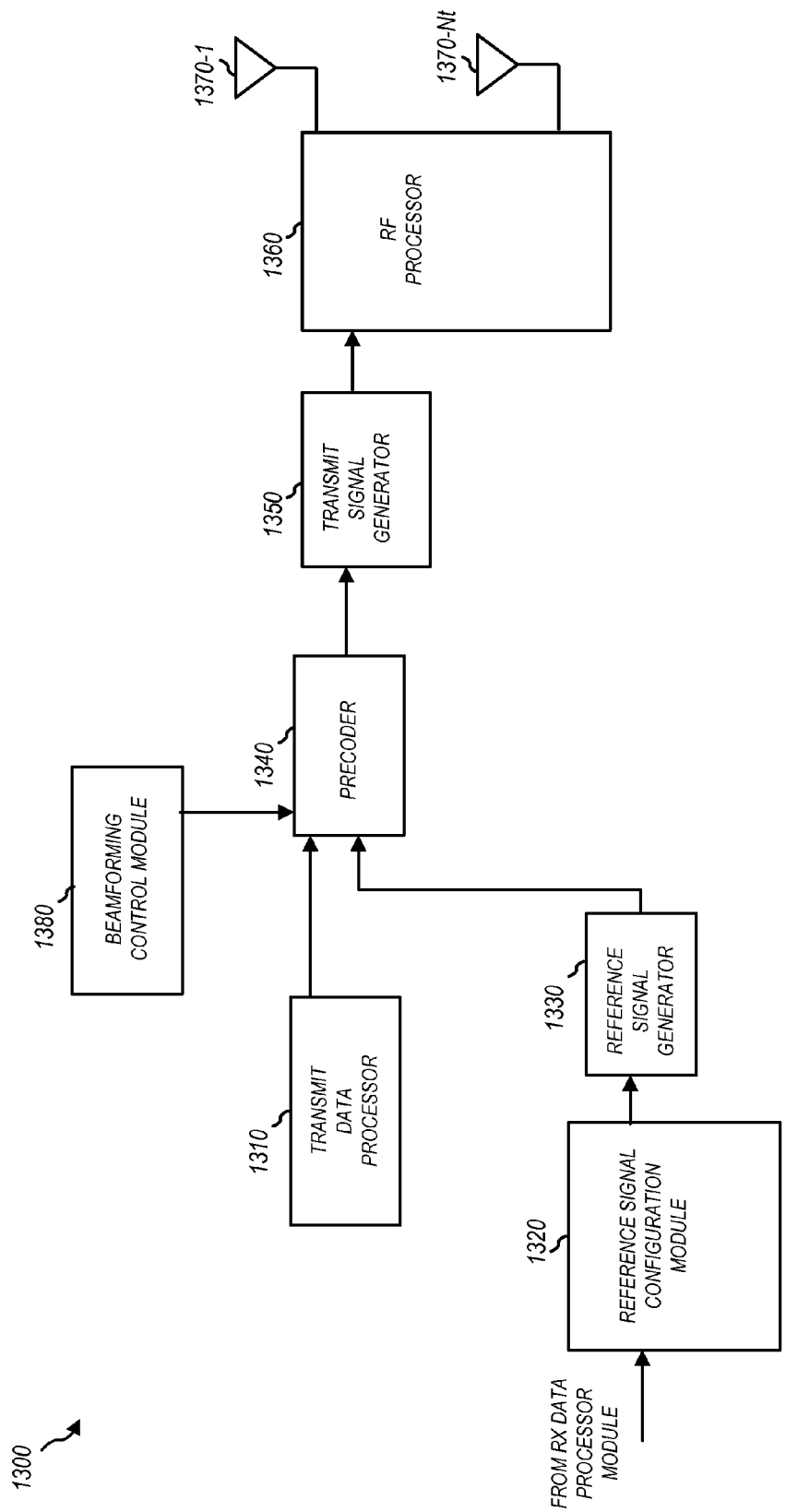
FIG. 13 is a block diagram of transmit signal precoding for a communication system.

Attention is now directed to FIG. 13, which illustrates additional details of an embodiment 1300 of a transmit subsystem including a reference signal generation apparatus configured for providing a precoded reference signal. Reference signal configuration logic 1320 may receive and/or request reference signal configuration data from an RX data processor module, such as module 1260 as shown in FIG. 12. Reference signal configuration data may include data defining a particular reference signal sequence and/or a particular reference signal pattern for transmission, such as may be generated to facilitate transmit beamforming A beamforming module 1380 may be included to provide beamforming precoding information to a precoder module 1340. Alternately, beamforming control module may be used to provide beamforming information to reference signal generator module 1330.

In some implementations, reference signal configuration logic 1320 may retrieve reference signal sequence and/or pattern data from a memory or other data storage element. Reference signal configuration module 1320 may then determine an appropriate reference signal sequence and/or reference signal pattern for transmission, which may then be generated by a reference signal generator 1330 coupled to or incorporated in reference signal configuration module 1320. The reference signal generator 1330 may then generate a reference signal and provide the reference signal to transmit signal generator module 1350. As shown, precoder 1340 may receive transmit data from a transmit data processor module 1310 and/or beamforming information from module 1380. The precoded transmit data from precoder 1340 and the reference signal from the reference signal generator 1330 are provided to a transmit signal generator module 1350, which generates a time domain transmit signal for RF processor module 1360. A transmit signal generated by RF processor module 1360 is then provided to one or more antennas 1370-1 to 1370-Nt, where Nt denotes the number of transmit antennas.

In some configurations, the apparatus for wireless communication includes means for performing various functions as described herein. In one aspect, the aforementioned means may be a processor or processors and associated memory in which embodiments reside, such as are shown in FIG. 12, and which are configured to perform the functions recited by the aforementioned means. The may be, for example, modules or apparatus residing in UEs, HeNBs and/or eNBs such as are shown in FIGS. 1-7 and FIG. 12. In another aspect, the aforementioned means may be a module or any apparatus configured to perform the functions recited by the aforementioned means.

In one or more exemplary embodiments, the functions, methods and processes described may be implemented in hardware, software, firmware, or any combination thereof. If implemented in software, the functions may be stored on or encoded as one or more instructions or code on a computer-readable medium. Computer-readable media includes computer storage media. Storage media may be any available media that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Disk and disc, as used herein, includes compact disc (CD), laser disc, optical disc, digital versatile disc (DVD), floppy disk and blu-ray disc where disks usually reproduce data magnetically, while discs reproduce data optically with lasers. Combinations of the above should also be included within the scope of computer-readable media.

It is understood that the specific order or hierarchy of steps or stages in the processes and methods disclosed are examples of exemplary approaches. Based upon design preferences, it is understood that the specific order or hierarchy of steps in the processes may be rearranged while remaining within the scope of the present disclosure. The accompanying method claims present elements of the various steps in a sample order, and are not meant to be limited to the specific order or hierarchy presented.

Those of skill in the art would understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Those of skill would further appreciate that the various illustrative logical blocks, modules, circuits, and algorithm steps described in connection with the embodiments disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure.

The various illustrative logical blocks, modules, and circuits described in connection with the embodiments disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps or stages of a method, process or algorithm described in connection with the embodiments disclosed herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such the processor can read information from, and write information to, the storage medium. In the alternative, the storage medium may be integral to the processor. The processor and the storage medium may reside in an ASIC. The ASIC may reside in a user terminal In the alternative, the processor and the storage medium may reside as discrete components in a user terminal.

The claims are not intended to be limited to the aspects shown herein, but is to be accorded the full scope consistent with the language of the claims, wherein reference to an element in the singular is not intended to mean "one and only one" unless specifically so stated, but rather "one or more." Unless specifically stated otherwise, the term "some" refers to one or more. A phrase referring to "at least one of" a list of items refers to any combination of those items, including single members. As an example, "at least one of: a, b, or c" is intended to cover: a; b; c; a and b; a and c; b and c; and a, b and c.

The previous description of the disclosed embodiments is provided to enable any person skilled in the art to make or use the present disclosure. Various modifications to these embodiments will be readily apparent to those skilled in the art, and the generic principles defined herein may be applied to other embodiments without departing from the spirit or scope of the disclosure. Thus, the present invention is not intended to be limited to the embodiments shown herein but is to be accorded the widest scope consistent with the principles and novel features disclosed herein. It is intended that the following claims and their equivalents define the scope of the invention.

We claim:

1. A method for wireless communication, comprising:
    detecting, at a user device, a signal transmitted by a restricted wireless network node which the user device is not subscribed to;
    determining, by the user device, from the signal, information regarding the restricted wireless network node;
    transmitting the information from the user device to the restricted wireless network node in order to cause the restricted wireless network node to adjust the signal transmitted in a direction of the user device to avoid or reduce interference at the user device; and
    establishing, by the user device, a connection with a serving node subsequent to the adjustment of the signal transmitted in the direction of the user device.

2. The method of claim 1 wherein the information includes spatial channel information.

3. The method of claim 2 wherein the information further includes signal strength information.

4. The method of claim 1 wherein the serving node comprises a macrocell node.

5. The method of claim 4 wherein the restricted wireless network node comprises a femtocell node.

6. A non-transitory computer program product comprising a non-transitory computer-readable medium, the computer-readable medium including codes for causing a computer to:
    detect, at a user device, a signal transmitted by a restricted wireless network node which the user device is not subscribed to;
    determine, at the user device, from the signal, information regarding the restricted wireless network node;
    transmit the information from the user device to the restricted wireless network node in order to cause the restricted wireless network node to adjust the signal transmitted in a direction of the user device to avoid or reduce interference at the user device; and
    establishing, by the user device, a connection with a serving node subsequent to the adjustment of the signal transmitted in the direction of the user device.

7. A user device, comprising:
    a receiver module configured to receive signals from a restricted wireless network node, to which the user device does not subscribe;
    a signal information module of the user device, the signal information module configured to determine, from one of the signals received from the restricted wireless network node, information regarding the restricted wireless network node;
    a transmitter module of the user device, the transmitter module configured to send the information to the restricted wireless network node in order to cause the restricted wireless network node to adjust the signal transmitted in the direction of the user device to avoid or reduce interference at the user device; and establish a connection with a serving node subsequent to the adjustment of the signal transmitted in the direction of the user device.

8. The device of claim 7 wherein the information includes spatial channel information.

9. The device of claim 8 wherein the information further includes signal strength information.

10. The device of claim 9 wherein the serving node comprises a macrocell node.

11. The device of claim 10 wherein the restricted wireless network node comprises a femtocell node.

12. A user device, comprising:
means for receiving signals at the user device, with which the user device is associated, and a restricted wireless network node, to which the user device does not subscribe;
means for determining, by the user device, from a signal received from the restricted wireless network node, information regarding the restricted wireless network node;
means for sending the information from the user device to the restricted wireless network node in order to cause the restricted wireless network node to adjust the signal transmitted in the direction of the user device to avoid or reduce interference at the user device; and
means for establishing a connection, by the user device, with a serving node subsequent to the adjustment of the signal transmitted in the direction of the user device.

13. A method for wireless communication, comprising:
receiving, at a restricted wireless network node, information from a user device that is not subscribed to the restricted wireless network node, wherein the information is determined from a signal provided from the restricted wireless network node; and
adjusting, by the restricted wireless network node, a signal transmitted in the direction of the user device by the restricted wireless network node based on the information received from the user device, in order to reduce or avoid interference at the user device, and in order for the user device to establish a connection with a serving node subsequent to the adjustment of the signal transmitted in the direction of the user device.

14. The method of claim 13 wherein the information includes spatial channel information.

15. The method of claim 14 wherein the information further includes signal strength information.

16. The method of claim 15 wherein the user device is served by a first wireless network node that comprises a macrocell node.

17. The method of claim 16 wherein the restricted wireless network node comprises a femtocell node.

18. The method of claim 13 wherein the adjusting includes beamforming at the output of the restricted wireless network node so as to mitigate interference in the direction of the user device.

19. A non-transitory computer program product comprising a non-transitory computer-readable medium, the computer-readable medium including codes for causing a computer to:
receive, at a restricted wireless network node, information from a user device that is not subscribed to the restricted wireless network node, wherein the information is determined from a signal provided from the restricted wireless network node; and
adjust, at the restricted wireless network node, a signal transmitted in a direction of the user device by the restricted wireless network node based on the information, in order to reduce or avoid interference at the user device, and in order for the user device to establish a connection with a serving node subsequent to the adjustment of the signal transmitted in the direction of the user device.

20. The non-transitory computer program product of claim 19 wherein the codes include codes for beamforming at the output of the restricted wireless network node so as to mitigate interference in the direction of the user device.

21. A wireless communications network node, comprising:
a receiver module of the wireless communications network node configured to receive a signal from a user device not subscribed to the wireless communications network node, said signal including node information regarding an output signal provided from the wireless communications network node;
a processor module of the wireless communications network node configured to determine, based on the information, output signal adjustment information to reduce or avoid interference at the user device;
a transmitter module of the wireless communications network node configured to adjust the output based on the output signal adjustment information and establish a connection with the user device subsequent to the adjustment of the output based on the output signal adjustment information.

22. The node of claim 21 wherein the node information includes spatial channel information.

23. The node of claim 22 wherein the node information further includes signal strength information.

24. The node of claim 21 wherein the adjusting includes beamforming at the node output so as to mitigate interference in the direction of the user device.

25. A wireless communications network node, comprising:
means for receiving, at the wireless communications network node, a signal from a user device not subscribed to the wireless communications network node, said signal including node information regarding an output signal provided from the network node;
means for determining, at the wireless communications network node, based on the node information, output signal adjustment information to reduce or avoid interference at the user device;
means for adjusting, at the wireless communications network node, the output signal based on the output signal adjustment information; and
means for establishing a connection with the user device subsequent to the adjustment of the output signal based on the output signal adjustment information.

26. The node of claim 25 further including means for beamforming at the node output so as to mitigate interference in the direction of the user device.

27. A method for wireless communication, comprising:
receiving, at a restricted node, from a user device not subscribed to the restricted node, a request to communicate;
establishing, by the restricted node, a communication link with the user device not subscribed to the restricted node;
receiving, by the restricted node, from the communication link with the user device not subscribed to the restricted node, information regarding an output signal of the restricted node; and
adjusting, by the restricted node, based on the information from the user device not subscribed to the restricted node, a signal transmitted in the direction of the user device by the restricted node, in order to reduce or avoid interference at the user device not subscribed to the restricted node, and in order for the user device to establish a connection with a serving node subsequent to the adjustment of the signal transmitted in the direction of the user device.

28. The method of claim 27 wherein the information includes spatial channel information.

29. The method of claim 28 wherein the information further includes signal strength information.

30. The method of claim 27 wherein the adjusting includes beamforming so as to mitigate interference in the direction of the user device.

31. The method of claim 27 further including receiving information regarding a reference signal received power (RSRP) of a first wireless network node in communication with the user device and wherein the adjusting is performed only when the RSRP is below a predefined threshold.

32. The method of claim 27 further including receiving information regarding a reference signal received quality (RSRQ) of a first wireless network node in communication with the user device and wherein the adjusting is performed only when the RSRQ is below a minimum threshold.

33. A non-transitory computer program product comprising a non-transitory computer-readable medium, the computer-readable medium including codes for causing a computer to:
receive, at a restricted node, from a user device not subscribed to the restricted node, a request to communicate;
establish, by the restricted node, a communication link with the user device not subscribed to the restricted node;
receive, by the restricted node, from the communication link with the user device not subscribed to the restricted node, information from the user device not subscribed to the network node regarding the restricted node; and
adjust, by the restricted node, based on the information, a signal transmitted in a direction of the user device by the restricted node, in order to reduce or avoid interference at the user device not subscribed to the restricted node, and in order for the user device to establish a connection with a serving node subsequent to the adjustment of the signal transmitted in the direction of the user device.

34. The non-transitory computer program product of claim 33 wherein the codes further include codes to beamform at the output so as to mitigate interference in the direction of the user device.

35. A wireless network node, comprising:
a receiver module of the wireless network node configured to:
receive, from a user device not subscribed to the network node, a request to communicate;
establish a communication link with the user device not subscribed to the network node; and
receive, from the communication link with the user device not subscribed to the network node, information from the user device not subscribed to the network node regarding the wireless network node;
a processor module of the wireless network node configured to determine, based on the information received from the user device not subscribed to the network node, output signal adjustment information; and
a transmitter module of the wireless network node configured to adjust a signal transmitted in a direction of the user device based on the output signal adjustment information, in order to reduce or avoid interference at the user device not subscribed to the restricted node, and in order for the user device to establish a connection with a serving node subsequent to the adjustment of the signal transmitted in the direction of the user device.

36. The node of claim 35 wherein the information includes spatial channel information.

37. The node of claim 36 wherein the information further includes signal strength information.

38. The node of claim 35 wherein the output is beamformed so as to mitigate interference in the direction of the user device.

39. A wireless network node, comprising:
means for receiving by the wireless network node, from a user device not subscribed to the wireless network node, a request to communicate;
means for establishing, by the wireless network node, a communication link with the user device not subscribed to the wireless network node;
means for receiving by the wireless network node, from the communication link with the user device not subscribed to the wireless network node, information regarding the wireless network node;
means for determining by the wireless network node, based on the information received from the user device not subscribed to the wireless network node, output signal adjustment information; and
means for adjusting a signal transmitted in a direction of the user device by the wireless network node based on the output signal adjustment information, in order to reduce or avoid interference at the user device not subscribed to the restricted node, and in order for the user device to establish a connection with a serving node subsequent to the adjustment of the signal transmitted in the direction of the user device.

* * * * *